(12) United States Patent
Zhang et al.

(10) Patent No.: US 12,513,596 B2
(45) Date of Patent: Dec. 30, 2025

(54) SYSTEMS AND METHODS FOR RELAY SERVICES

(71) Applicant: ZTE CORPORATION, Guangdong (CN)

(72) Inventors: Boyuan Zhang, Shenzhen (CN); Mengzhen Wang, Shenzhen (CN); Lin Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 447 days.

(21) Appl. No.: 18/157,575

(22) Filed: Jan. 20, 2023

(65) Prior Publication Data

US 2023/0180097 A1  Jun. 8, 2023

Related U.S. Application Data

(63) Continuation of application No. PCT/CN2020/106816, filed on Aug. 4, 2020.

(51) Int. Cl.
| | |
|---|---|
| *H04W 40/22* | (2009.01) |
| *H04W 52/46* | (2009.01) |
| *H04W 76/10* | (2018.01) |
| *H04W 88/04* | (2009.01) |

(52) U.S. Cl.
CPC .......... *H04W 40/22* (2013.01); *H04W 76/10* (2018.02)

(58) Field of Classification Search
CPC ..... H04W 40/22; H04W 52/46; H04W 88/04; H04W 76/10
See application file for complete search history.

(56) References Cited

U.S. PATENT DOCUMENTS

| | | | | |
|---|---|---|---|---|
| 2016/0135203 | A1* | 5/2016 | Kim | H04W 76/23 370/315 |
| 2016/0337954 | A1* | 11/2016 | Gulati | H04W 48/17 |
| 2017/0094656 | A1* | 3/2017 | Chen | H04W 76/14 |
| 2018/0054237 | A1* | 2/2018 | Tseng | H04W 36/0022 |
| 2018/0084442 | A1* | 3/2018 | Lee | H04W 76/27 |
| 2018/0234862 | A1* | 8/2018 | Lee | H04W 88/04 |
| 2020/0221532 | A1* | 7/2020 | Jung | H04W 48/20 |
| 2022/0312178 | A1* | 9/2022 | Wu | H04W 8/005 |
| 2022/0369215 | A1* | 11/2022 | Dees | H04W 76/14 |

FOREIGN PATENT DOCUMENTS

| | | |
|---|---|---|
| CN | 108809897 A | 11/2018 |
| CN | 110611944 A | 12/2019 |
| EP | 3 618 291 A1 | 3/2020 |
| EP | 3 618 391 A1 | 3/2020 |

(Continued)

OTHER PUBLICATIONS

Extended European Search Report on EP 20948615.8 dated Jul. 24, 2023 (11 pages).

(Continued)

*Primary Examiner* — Kent Krueger
(74) *Attorney, Agent, or Firm* — Foley & Lardner LLP

(57) ABSTRACT

Presented are systems, methods, apparatuses, or computer-readable media for relay service. A second wireless communication device in a vicinity of a first wireless communication device may receive information to be used for selection of a relay device. The second wireless communication device may determine whether to wirelessly connect with the first wireless communication device as the relay device.

20 Claims, 10 Drawing Sheets

(56) References Cited

FOREIGN PATENT DOCUMENTS

| EP | 3 758 418 A1 | 12/2020 |
| EP | 3 833 070 A1 | 6/2021 |
| JP | 2009-033642 A | 2/2009 |
| JP | 2019-169781 A | 10/2019 |
| JP | 2022-501857 A | 1/2022 |
| WO | WO-2020/029191 A1 | 2/2020 |

OTHER PUBLICATIONS

Nokia et al., "On the peer UE capability transfer in unicast sidelink", 3GPP TSG-RAN WG2 Meeting #110e, R2-2004597, Jun. 12, 2020, Elbonia (7 pages).

Notice of Reasons for Rejection for JP Appl. No. 2023-507419, dated Feb. 9, 2024 (with English translation, 10 pages).

International Search Report and Written Opinion for PCT Appl. No. PCT/CN2020/106816, mailed May 11, 2021 (9 pages).

LG Electronics Inc.: "RRC relay handover procedure for remote UE" 3GPP TSG-RAN WG2 Meeting #97; R2-1701270; Feb. 17, 2017; Athens, Greece (4 pages).

Nokia et al.: "Initial relay discovery and relay reselection" 3GPP TSG-RAN WG2 Meeting #97; R2-1701086; Feb. 17, 2017; Athens, Greece (4 pages).

\* cited by examiner

SYSTEMS AND METHODS FOR RELAY SERVICES

CROSS-REFERENCE TO RELATED APPLICATION

This application claims the benefit of priority under 35 U.S.C. § 120 as a continuation of PCT Patent Application No. PCT/CN2020/106816, filed on Aug. 4, 2020, the disclosure of which is incorporated herein by reference in its entirety.

TECHNICAL FIELD

The disclosure relates generally to wireless communications, including but not limited to systems and methods for systems and methods for relay services.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium. A second wireless communication device in a vicinity of a first wireless communication device may receive information to be used for selection of a relay device. The second wireless communication device may determine whether to wirelessly connect with the first wireless communication device as the relay device.

In some embodiments, determining whether to select the first wireless communication device may include receiving, from a wireless communication node, an indication of at least one wireless communication device to wirelessly connect with as the relay device. In some embodiments, determining whether to select the first wireless communication device may include determining, according to the indication, to select the first wireless communication device to wirelessly connect with as the relay device.

In some embodiments, the first wireless communication device may send to a wireless communication node at least one relay type supported, the at least one relay type comprising at least one of: layer 2 relay or layer 3 relay. In some embodiments, the first wireless communication device may send to the wireless communication node a preference for one or more of the at least one relay type supported. In some embodiments, the first wireless communication device may receive, from the wireless communication node a configuration to configure the first wireless communication device with one or more of the at least one relay type. In some embodiments, the first wireless communication device may send to the second wireless communication device, an indication of the one or more of the at least one relay type with which the first wireless communication device is configured. In some embodiments, the first wireless communication device may receive from the second wireless communication device, an indication of a preferred relay type or a supported relay type.

In some embodiments, the second wireless communication device may receive the information from the first wireless communication device. The information may include an indication of the one or more of the at least one relay type with which the first wireless communication device is configured. In some embodiments, the second wireless communication device may determine according to one or more relay types that the second wireless communication device supports, and according to the indication of the one or more of the at least one relay type with which the first wireless communication device is configured, to select the first wireless communication device to wirelessly connect with as the relay device.

In some embodiments, the first wireless communication device may send, to a wireless communication node, a frequency list with which the first wireless communication device is configured. In some embodiments, the first wireless communication device may receive from the wireless communication node, a frequency-of-interest list to configure the first wireless communication device. In some embodiments, the first wireless communication device may send to the second wireless communication device, the frequency-of-interest list.

In some embodiments, the second wireless communication device may receive the information from the first wireless communication device. The information may include the frequency-of-interest list. In some embodiments, the second wireless communication device may determine to select the first wireless communication device to wirelessly connect with according to the frequency-of-interest list.

In some embodiments, the second wireless communication device may select, as the relay device, a wireless communication device with a greatest number of frequencies-of-interest in common with those of the second wireless communication device, or in common with those targeted on a service destination identifier of the second wireless communication device that has a highest quality-of-service (QoS) or priority.

In some embodiments, the first wireless communication device may receive, from the wireless communication node, priority information for the first wireless communication device. In some embodiments, the first wireless communication device may send to the second wireless communication device, the priority information.

In some embodiments, the second wireless communication device may receive the information from the first wireless communication device. The information may include the priority information for the first wireless communication device. In some embodiments, the second wireless communication device may determine to select the first wireless communication device to wirelessly connect with, according to the priority information, whether the first wireless communication device has a highest priority among candidate relay devices.

In some embodiments, the first wireless communication device may receive from the wireless communication node, information about quality-of-service (QoS) supported by the first wireless communication device to relay traffic. The information may include at least one of: a white QoS flow identifier (QFI) list, a black QFI list or a default priority threshold. In some embodiments, the first wireless communication device may send to the second wireless communication device, the information about QoS supported by the first wireless communication device to relay traffic.

In some embodiments, the second wireless communication device may receive the information from the first wireless communication device. The information may include the information about QoS supported by the first wireless communication device to relay traffic. In some embodiments, the second wireless communication device may determine to select the first wireless communication device to wirelessly connect with, according to the first wireless communication device having at least one QoS profile of relay traffic supported by the white QFI list or excluded by the black QFI list, or according to the first wireless communication device having a priority value that satisfies the default priority threshold.

In some embodiments, the first wireless communication device may send to a wireless communication node, assistance information of the first wireless communication device.

In some embodiments, the second wireless communication device may determine whether to directly connect with the relay device in network relay mode. In some embodiments, the second wireless communication device may receive the information from the wireless communication node. The information may include one or more identifiers of candidate relay devices selected according to at least the assistance information of the first wireless communication device. In some embodiments, the second wireless communication device may determine according to the one or more identifiers of candidate relay devices, to select the first wireless communication device to wirelessly connect with as the relay device.

In some embodiments, the first wireless communication device may be in communication with a first wireless communication node. The first wireless communication may send, to a second wireless communication node via an Xn or X2 interface of the first wireless communication node, assistance information of the first wireless communication device.

In some embodiments, the second wireless communication device in a network release message may receive the information from the wireless communication node. The information may include one or more identifiers of candidate relay devices selected according to at least the assistance information of the first wireless communication device. In some embodiments, the second wireless communication device may determine according to the one or more identifiers of candidate relay devices, to select the first wireless communication device to wirelessly connect with as the relay device.

In some embodiments, the first wireless communication device may send to a third wireless communication device, a reference signal received power (RSRP) measurement of a link between the first wireless communication device and the second wireless communication device. In some embodiments, the third wireless communication device may determine whether to include the first wireless communication device as a candidate relay device, according to the RSRP measurement and a configured average RSRP threshold.

In some embodiments, the first wireless communication device may send to a third wireless communication device, a reference signal received power (RSRP) measurement of a link between the first wireless communication device and the second wireless communication device. In some embodiments, the third wireless communication device may determine whether to include the first wireless communication device as a candidate relay device, according to a threshold, the RSRP measurement, and a RSRP measurement of a link between the first wireless communication device and the third wireless communication device.

In some embodiments, the first wireless communication device may send to a third wireless communication device, a reference signal received power (RSRP) measurement of a link between the first wireless communication device and the second wireless communication device. In some embodiments, the third wireless communication device may determine whether to include the first wireless communication device as a candidate relay device, according to the RSRP measurement and a first threshold, and a RSRP measurement of a link between the first wireless communication device and the third wireless communication device, and a second threshold.

In some embodiments, the first wireless communication device may determine a failure in a link established between the first wireless communication device and the second wireless communication device. In some embodiments, the first wireless communication device may send to a third wireless communication device, an indication of a type of the failure of the link.

In some embodiments, the first wireless communication device may determine a degradation in a link established between the first wireless communication device and the second wireless communication device, beyond a threshold. In some embodiments, the first wireless communication device may send to a third wireless communication device, link quality information of the link.

At least one aspect is directed to a system, a method, an apparatus, or a computer-readable medium. A first wireless communication device in a vicinity of a second wireless communication device may send information to be used for selection of a relay device. The second wireless communication device may be caused to determine whether to wirelessly connect with the first wireless communication device as the relay device.

In some embodiments, causing the second wireless communication device may include receiving, from a wireless communication node, an indication of at least one wireless communication device to wirelessly connect with as the relay device. In some embodiments, causing the second wireless communication device may include determining, according to the indication, to select the first wireless communication device to wirelessly connect with as the relay device.

In some embodiments, the first wireless communication device may send to a wireless communication node at least one relay type supported, the at least one relay type comprising at least one of: layer 2 relay or layer 3 relay. In some embodiments, the first wireless communication device may send to the wireless communication node a preference for one or more of the at least one relay type supported. In some embodiments, the first wireless communication device may receive, from the wireless communication node a configuration to configure the first wireless communication device with one or more of the at least one relay type. In some embodiments, the first wireless communication device may send to the second wireless communication device, an indication of the one or more of the at least one relay type with which the first wireless communication device is configured. In some embodiments, the first wireless communication device may receive from the second wireless communication device, an indication of a preferred relay type or a supported relay type.

In some embodiments, the first wireless communication device may send the information to the second wireless communication device. The information may include an indication of the one or more of the at least one relay type with which the first wireless communication device is configured. In some embodiments, the second wireless communication device may be caused to determine according to one or more relay types that the second wireless communication device supports, and according to the indication of the one or more of the at least one relay type with which the first wireless communication device is configured, to select the first wireless communication device to wirelessly connect with as the relay device.

In some embodiments, the first wireless communication device may send, to a wireless communication node, a frequency list with which the first wireless communication device is configured. In some embodiments, the first wireless communication device may receive from the wireless communication node, a frequency-of-interest list to configure the first wireless communication device. In some embodiments, the first wireless communication device may send to the second wireless communication device, the frequency-of-interest list.

In some embodiments, the first wireless communication device may send the information to the second wireless communication device. The information may include the frequency-of-interest list. In some embodiments, the second wireless communication device may be caused to determine to select the first wireless communication device to wirelessly connect with according to the frequency-of-interest list.

In some embodiments, the second wireless communication device may be caused to select, as the relay device, a wireless communication device with a greatest number of frequencies-of-interest in common with those of the second wireless communication device, or in common with those targeted on a service destination identifier of the second wireless communication device that has a highest quality-of-service (QoS) or priority.

In some embodiments, the first wireless communication device may receive, from the wireless communication node, priority information for the first wireless communication device. In some embodiments, the first wireless communication device may send to the second wireless communication device, the priority information.

In some embodiments, the first wireless communication device may send the information to the second wireless communication device. The information may include the priority information for the first wireless communication device. In some embodiments, the second wireless communication device may be caused to determine to select the first wireless communication device to wirelessly connect with, according to the priority information, whether the first wireless communication device has a highest priority among candidate relay devices.

In some embodiments, the first wireless communication device may receive from the wireless communication node, information about quality-of-service (QoS) supported by the first wireless communication device to relay traffic. The information may include at least one of: a white QoS flow identifier (QFI) list, a black QFI list or a default priority threshold. In some embodiments, the first wireless communication device may send to the second wireless communication device, the information about QoS supported by the first wireless communication device to relay traffic.

In some embodiments, the second wireless communication device may receive the information from the first wireless communication device. The information may include the information about QoS supported by the first wireless communication device to relay traffic. In some embodiments, the second wireless communication device may be caused to determine to select the first wireless communication device to wirelessly connect with, according to the first wireless communication device having at least one QoS profile of relay traffic supported by the white QFI list or excluded by the black QFI list, or according to the first wireless communication device having a priority value that satisfies the default priority threshold.

In some embodiments, the first wireless communication device may send, to a wireless communication node, assistance information of the first wireless communication device.

In some embodiments, the second wireless communication device may determine whether to directly connect with the relay device in network relay mode. In some embodiments, the second wireless communication device may receive the information from the wireless communication node. The information may include one or more identifiers of candidate relay devices selected according to at least the assistance information of the first wireless communication device. In some embodiments, the second wireless communication device may determine according to the one or more identifiers of candidate relay devices, to select the first wireless communication device to wirelessly connect with as the relay device.

In some embodiments, the first wireless communication device may be in communication with a first wireless communication node. The first wireless communication may send, to a second wireless communication node via an Xn or X2 interface of the first wireless communication node, assistance information of the first wireless communication device.

In some embodiments, the second wireless communication device in a network release message may receive the information from the wireless communication node. The information may include one or more identifiers of candidate relay devices selected according to at least the assistance information of the first wireless communication device. In some embodiments, the second wireless communication device may determine according to the one or more identifiers of candidate relay devices, to select the first wireless communication device to wirelessly connect with as the relay device.

In some embodiments, the first wireless communication device may send to a third wireless communication device, a reference signal received power (RSRP) measurement of a link between the first wireless communication device and the second wireless communication device. In some embodiments, the third wireless communication device may be caused to determine whether to include the first wireless communication device as a candidate relay device, according to the RSRP measurement and a configured average RSRP threshold.

In some embodiments, the first wireless communication device may send to a third wireless communication device, a reference signal received power (RSRP) measurement of a link between the first wireless communication device and the second wireless communication device. In some embodiments, the third wireless communication device may be caused to determine whether to include the first wireless communication device as a candidate relay device, according to a threshold, the RSRP measurement, and a RSRP measurement of a link between the first wireless communication device and the third wireless communication device.

In some embodiments, the first wireless communication device may send to a third wireless communication device, a reference signal received power (RSRP) measurement of a link between the first wireless communication device and the second wireless communication device. In some embodiments, the third wireless communication device may be caused to determine whether to include the first wireless communication device as a candidate relay device, according to the RSRP measurement and a first threshold, and a RSRP measurement of a link between the first wireless communication device and the third wireless communication device, and a second threshold.

In some embodiments, the first wireless communication device may determine a failure in a link established between the first wireless communication device and the second wireless communication device. In some embodiments, the first wireless communication device may send to a third wireless communication device, an indication of a type of the failure of the link.

In some embodiments, the first wireless communication device may determine a degradation in a link established between the first wireless communication device and the second wireless communication device, beyond a threshold. In some embodiments, the first wireless communication device may send to a third wireless communication device, link quality information of the link.

At least one aspect is directed to a system, a method, an apparatus, or a computer-readable medium. A wireless communication node may send to a second wireless communication device in a vicinity of a first wireless communication device, information to be used for selection of a relay device. The second wireless communication device may be caused to determine whether to wirelessly connect with the first wireless communication device as the relay device.

In some embodiments, causing the second wireless communication device may include receiving, from a wireless communication node, an indication of at least one wireless communication device to wirelessly connect with as the relay device. In some embodiments, causing the second wireless communication device may include determining, according to the indication, to select the first wireless communication device to wirelessly connect with as the relay device.

In some embodiments, the first wireless communication device may send to a wireless communication node at least one relay type supported, the at least one relay type comprising at least one of: layer 2 relay or layer 3 relay. In some embodiments, the first wireless communication device may send to the wireless communication node a preference for one or more of the at least one relay type supported. In some embodiments, the first wireless communication device may receive, from the wireless communication node a configuration to configure the first wireless communication device with one or more of the at least one relay type. In some embodiments, the first wireless communication device may send to the second wireless communication device, an indication of the one or more of the at least one relay type with which the first wireless communication device is configured. In some embodiments, the first wireless communication device may receive from the second wireless communication device, an indication of a preferred relay type or a supported relay type.

In some embodiments, the first wireless communication device may send the information to the second wireless communication device. The information may include an indication of the one or more of the at least one relay type with which the first wireless communication device is configured. In some embodiments, the second wireless communication device may be caused to determine according to one or more relay types that the second wireless communication device supports, and according to the indication of the one or more of the at least one relay type with which the first wireless communication device is configured, to select the first wireless communication device to wirelessly connect with as the relay device.

In some embodiments, the wireless communication node may receive, from the first wireless communication device, a frequency list with which the first wireless communication device is configured. In some embodiments, the wireless communication device may send, to the first wireless communication device, a frequency-of-interest list to configure the first wireless communication device. In some embodiments, the first wireless communication device may be caused to send to the second wireless communication device, the frequency-of-interest list.

In some embodiments, the first wireless communication device may send the information to the second wireless communication device. The information may include the frequency-of-interest list. In some embodiments, the second wireless communication device may be caused to determine to select the first wireless communication device to wirelessly connect with according to the frequency-of-interest list.

In some embodiments, the second wireless communication device may be caused to select, as the relay device, a wireless communication device with a greatest number of frequencies-of-interest in common with those of the second wireless communication device, or in common with those targeted on a service destination identifier of the second wireless communication device that has a highest quality-of-service (QoS) or priority.

In some embodiments, the first wireless communication device may receive, from the wireless communication node, priority information for the first wireless communication device. In some embodiments, the first wireless communication device may send to the second wireless communication device, the priority information.

In some embodiments, the first wireless communication device may send the information to the second wireless communication device. The information may include the priority information for the first wireless communication device. In some embodiments, the second wireless communication device may be caused to determine to select the first wireless communication device to wirelessly connect with, according to the priority information, whether the first wireless communication device has a highest priority among candidate relay devices.

In some embodiments, the wireless communication node may send, to the first wireless communication device, information about quality-of-service (QoS) supported by the first wireless communication device to relay traffic. The information may include at least one of: a white QoS flow identifier (QFI) list, a black QFI list or a default priority threshold. In some embodiments, the first wireless communication device may be caused to send to the second wireless communication device, the information about QoS supported by the first wireless communication device to relay traffic.

In some embodiments, the second wireless communication device may receive the information from the first wireless communication device. The information may include the information about QoS supported by the first wireless communication device to relay traffic. In some embodiments, the second wireless communication device may be caused to determine to select the first wireless communication device to wirelessly connect with, according to the first wireless communication device having at least one QoS profile of relay traffic supported by the white QFI list or excluded by the black QFI list, or according to the first wireless communication device having a priority value that satisfies the default priority threshold.

In some embodiments, the wireless communication node may receive, from the first wireless communication device, assistance information of the first wireless communication device.

In some embodiments, the second wireless communication device may determine whether to directly connect with the relay device in network relay mode. In some embodiments, the second wireless communication device may receive the information from the wireless communication node. The information may include one or more identifiers of candidate relay devices selected according to at least the assistance information of the first wireless communication device. In some embodiments, the second wireless communication device may determine according to the one or more identifiers of candidate relay devices, to select the first wireless communication device to wirelessly connect with as the relay device.

In some embodiments, the first wireless communication device may be in communication with a first wireless communication node. The first wireless communication may send, to a second wireless communication node via an Xn or X2 interface of the first wireless communication node, assistance information of the first wireless communication device.

In some embodiments, the second wireless communication device in a network release message may receive the information from the wireless communication node. The information may include one or more identifiers of candidate relay devices selected according to at least the assistance information of the first wireless communication device. In some embodiments, the second wireless communication device may determine according to the one or more identifiers of candidate relay devices, to select the first wireless communication device to wirelessly connect with as the relay device.

In some embodiments, the first wireless communication device may send to a third wireless communication device, a reference signal received power (RSRP) measurement of a link between the first wireless communication device and the second wireless communication device. In some embodiments, the third wireless communication device may be caused to determine whether to include the first wireless communication device as a candidate relay device, according to the RSRP measurement and a configured average RSRP threshold.

In some embodiments, the first wireless communication device may send to a third wireless communication device, a reference signal received power (RSRP) measurement of a link between the first wireless communication device and the second wireless communication device. In some embodiments, the third wireless communication device may be caused to determine whether to include the first wireless communication device as a candidate relay device, according to a threshold, the RSRP measurement, and a RSRP measurement of a link between the first wireless communication device and the third wireless communication device.

In some embodiments, the first wireless communication device may send to a third wireless communication device, a reference signal received power (RSRP) measurement of a link between the first wireless communication device and the second wireless communication device. In some embodiments, the third wireless communication device may be caused to determine whether to include the first wireless communication device as a candidate relay device, according to the RSRP measurement and a first threshold, and a RSRP measurement of a link between the first wireless communication device and the third wireless communication device, and a second threshold.

In some embodiments, the first wireless communication device may determine a failure in a link established between the first wireless communication device and the second wireless communication device. In some embodiments, the first wireless communication device may send to a third wireless communication device, an indication of a type of the failure of the link.

In some embodiments, the first wireless communication device may determine a degradation in a link established between the first wireless communication device and the second wireless communication device, beyond a threshold. In some embodiments, the first wireless communication device may send to a third wireless communication device, link quality information of the link.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
| --- | --- |
| 3GPP | 3rd Generation Partnership Project |
| 5G | 5th Generation Mobile Networks |
| 5G-AN | 5G Access Network |
| 5G gNB | Next Generation NodeB |
| CN | Core Network |
| DCI | Downlink Control Information |
| DL | Down Link or Downlink |
| DRX | Discontinuous Reception |
| DU | Distributed Unit |
| ECGI | Evolved Terrestrial Radio Access Network (E-UTRAN) Cell Global Identification |
| LCID | Logical Channel Identifier |
| NCGI | NR Cell Global Identity |
| NG | Next Generation |
| NW | Network |
| OFDM | Orthogonal Frequency-Division Multiplexing |
| OFDMA | Orthogonal Frequency-Division Multiple Access |
| PCI | Physical Cell Identifier |
| PDCCH | Physical Downlink Control Channel |

-continued

| Acronym | Full Name |
| --- | --- |
| PDCP | Packet Data Convergence Protocol |
| PDSCH | Physical Downlink Shared Channel |
| PHY | Physical Layer |
| PUCCH | Physical Uplink Control Channel |
| QFI | QoS Flow Identifier |
| QoS | Quality of Service |
| RA | Random Access |
| RB | Resource Bearer |
| RAN | Random Access Network |
| RNA | RAN Notification Area |
| RLC | Radio Link Control |
| RNTI | Radio Network Temporary Identifier |
| RSRP | Reference Signal Receive Power |
| RRC | Radio Resource Control |
| SIB | System Information Block |
| S-TMSI | Short Temporary Mobile Subscriber Identity |
| UE | User Equipment |
| UL | Up Link or Uplink |

1. Mobile Communication Technology and Environment

Figure 1:
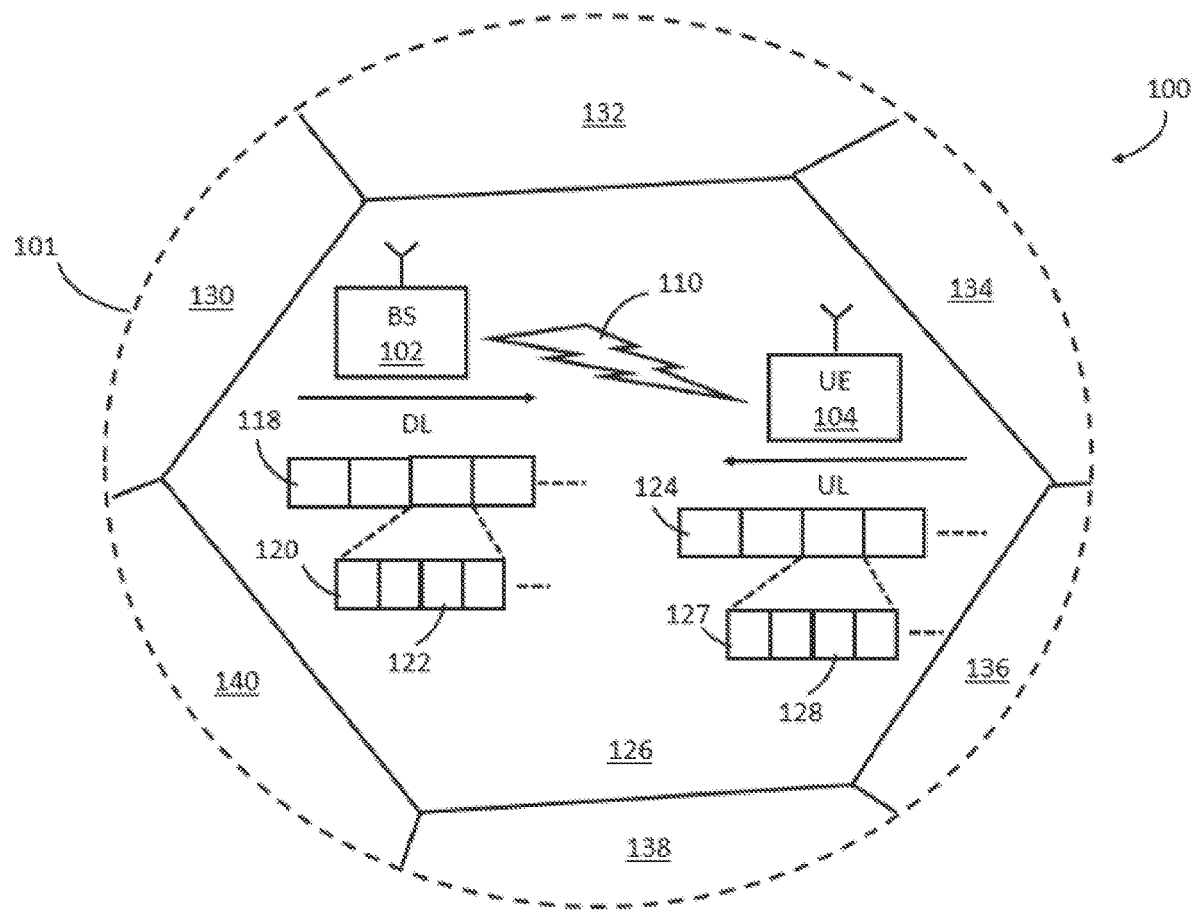
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
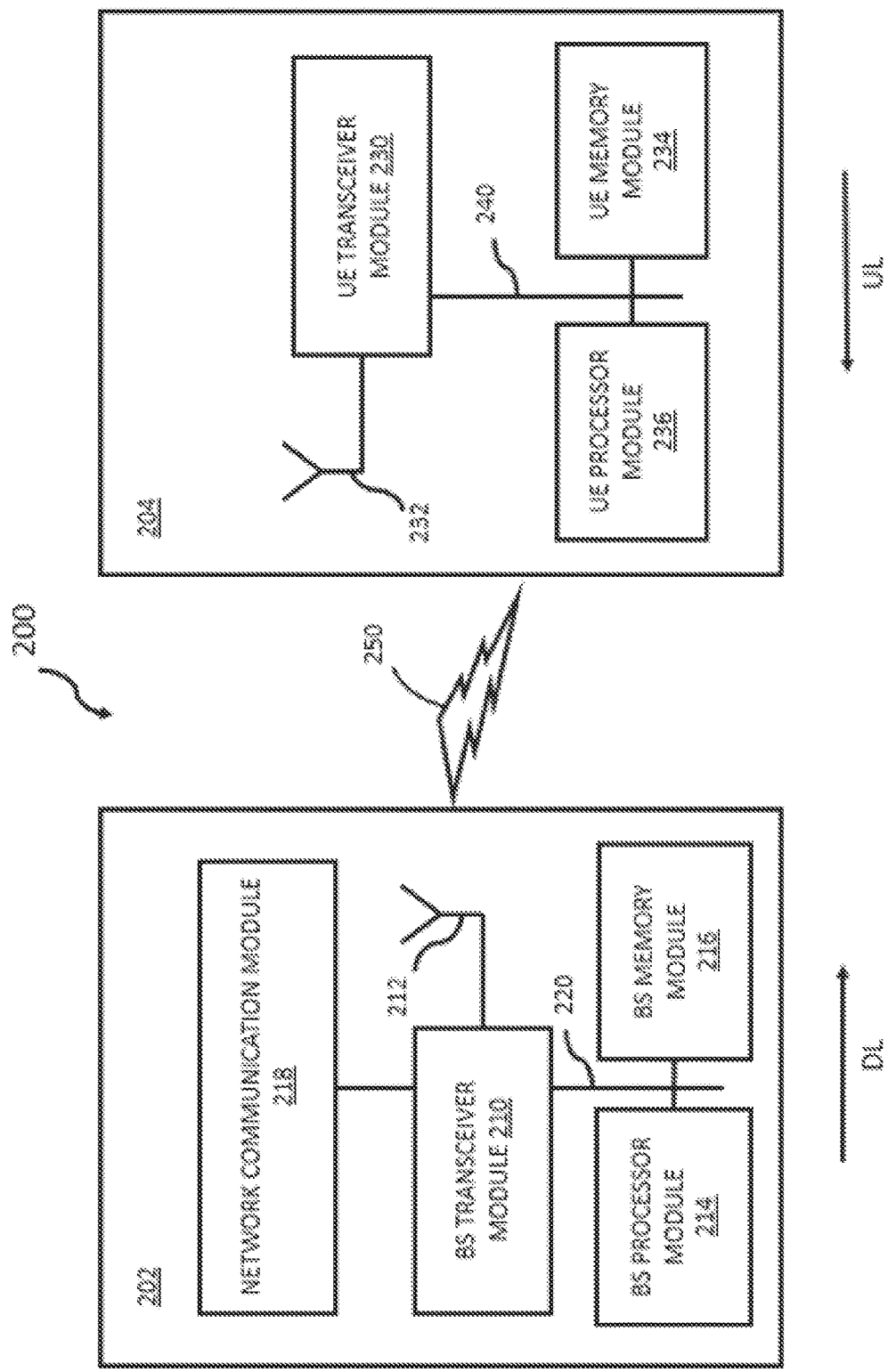
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Relay Services

One of the technical challenges in next generation communications may involve a remote UE (e.g., the UE 104) performing selection of a relay UE and conditions to trigger the remote UE to perform relay UE discovery and communication. In the field of wireless communications, with the rapid development of smart terminals and mobile Internet applications, there may be higher and higher requirements for user experience, high speed, and large data volume. Cellular network with base station as the data transfer node center may have limitations in terms of high data rate and proximity service support.

In accounting for this demand, Sidelink communication technology may be implemented. The technology may also be referred to as ProSe technology. The application of Sidelink technology can reduce the burden on the cellular network, reduce the battery power consumption of UE, increase the data rate, and improve the robustness of the network infrastructure, all the while satisfying the requirements of the aforementioned high data rate services and proximity services.

Sidelink technology may include: (1) Sidelink discovery technology and (2) Sidelink communication technology. Sidelink discovery technology may include a process to determine the proximity of two or more Sidelink UEs (e.g., within the range of Sidelink direct communication) or to determine that a first UE is adjacent to a second UE. In general, Sidelink UE can discover each other by sending or receiving discovery signals or information. Under the coverage of a cellular network, the network can assist Sidelink UE in Sidelink discovery. In addition, Sidelink communication technology may include technology in which part or all of the communication of data between Sidelink UEs that can be directly communicated without going through the network infrastructure. Sidelink technology can work in licensed or unlicensed frequency bands, allowing multiple UEs supporting the Sidelink function to perform direct discovery or direct communication with or without network coverage.

Figure 3:
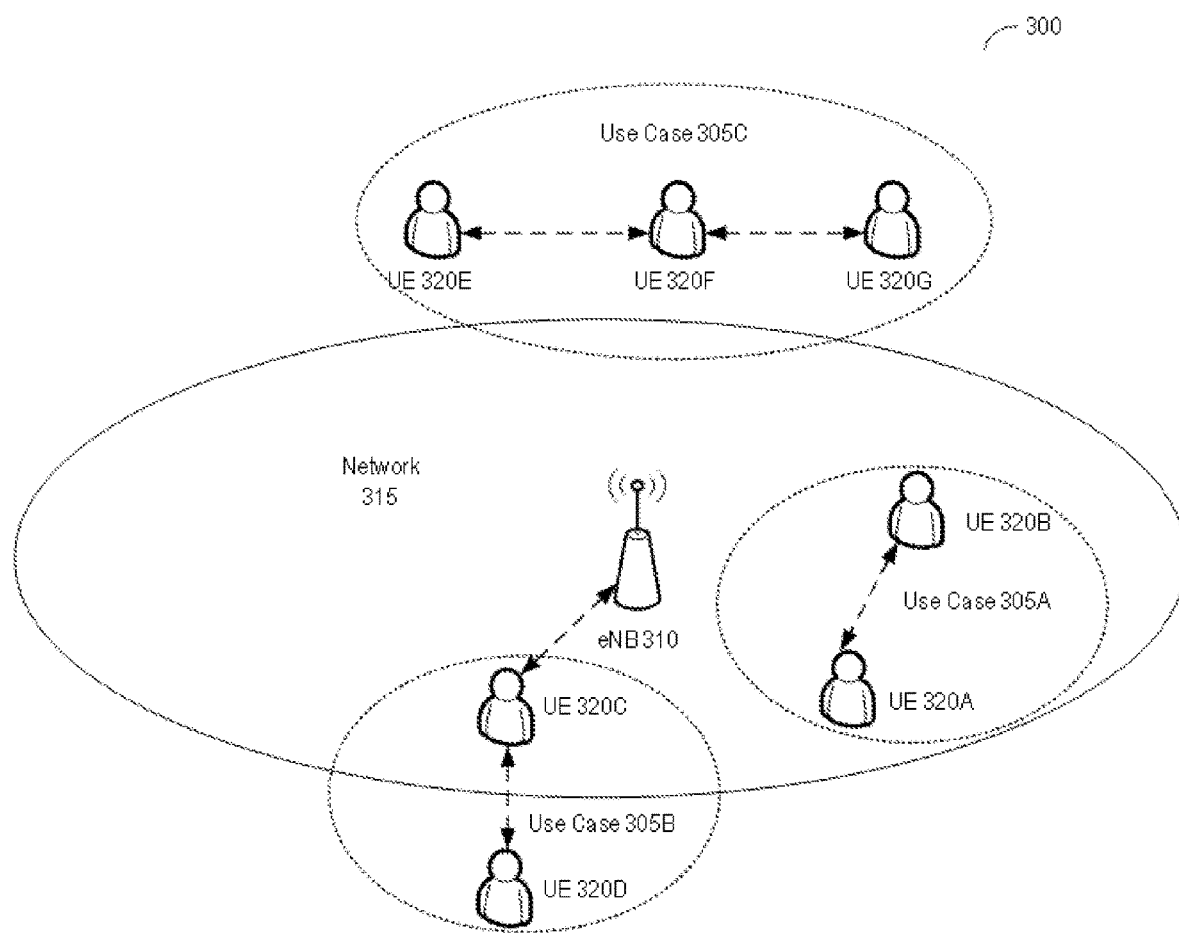
FIG. 3 illustrates a block diagram of an example environment for sidelink and relay services, in accordance with an illustrative embodiment.

Referring now to FIG. 3, depicted is a block diagram of a system or an environment 300 for Sidelink and relay services. As depicted, the environment 300 may include at least one a network node 310 (e.g., BS 102) and one or more UEs 320A-G (e.g., UE 104) (generally referred to as UE 320). The network node 310 may maintain, service, or otherwise provide at least one network 315. The network 315 may cover some UEs and may not cover other UEs. There may be three use cases 305A-C for Sidelink technology for the environment 300.

Under use case 305A, UE 320A and UE 320B may perform Sidelink discovery or communication under the coverage of the cellular network 315 of the network node 310. The user plane data may not pass through the network infrastructure. This use case 305A can further include the following two branches: (a) Sidelink discovery and (b) Sidelink communication. Under discovery, the branch can be further divided into open Sidelink discovery and restricted Sidelink discovery. Under communication, the branch can be further divided into Sidelink broadcast communication, Sidelink multicast communication, and Sidelink unicast communication.

Under use case 305B, the UE-to-Network Relay transmission in weak uncovered areas (e.g., outside the network 315) may allow UE 320D with poor signal quality to communicate with the network through nearby UE 320C with network coverage. This can help operators expand coverage and increase capacity.

Under use case 305C, multi-hop communication between UEs 320E-G (UE-to-UE Relay) may be allowed. For example, in the event of an earthquake or emergency, the cellular network 315 may be unable to work normally or otherwise unable to reach UEs 320E-G. In this case, the communication may be among the control plane and UEs 320E-G. One-hop or multi-hop data communication may be out without going through the network infrastructure (e.g., network node 310 or network 315).

In all use cases 320A-C, Sidelink communications may maintain service continuity. As the UE 320 moves, the relative distance between the UEs 320 in Sidelink communication may change. It may no longer suitable for Sidelink communication or the UE 320 may return to where there is network coverage 315. As a result, there may be no need to relay data through Sidelink. In addition, two UEs 320 that are communicating with each other find that they are close to each other.

To reduce the load on the cellular network 315 and reduce the transmission delay, the data communication may be switched from cellular to the Sidelink. In these cases, switching the traffic between Sidelink UEs between the Sidelink path and the cellular path may be considered. In the process of service flow switching, ensuring service continuity should be maintained and degradation of the quality of communication should be avoided.

To ensure the normal operation of the UE-to-Network relay and UE-to-UE relay scenarios, the relay UE 320 may use a clear base station instruction to determine whether the UE 320 can perform relay service transmission. As for the remote UE 320, the remote UE 320 may select a suitable relay UE3 320 to transmit relay data in accordance with the procedures detailed herein below. Throughout the present disclosure, the term "the first UE 320A" may refer to the relay UE, the term "the second UE 320B" may refer to remote UE1, and the term "the third UE 320C" may refer to another remote UE2.

A. Relay Type Configurations to Configure Relay Services

Figure 4:
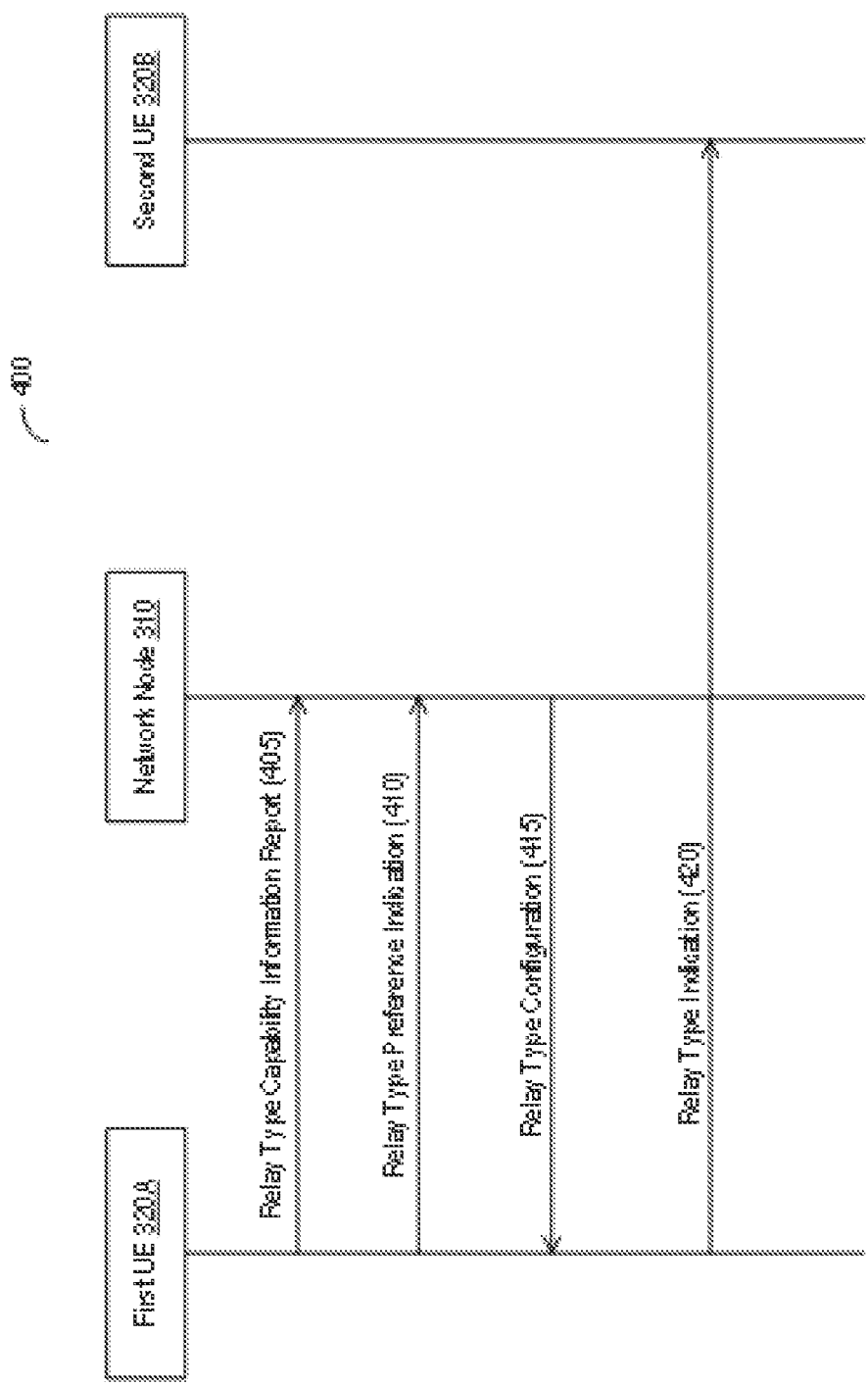
FIG. 4 illustrates a sequence diagram of an example procedure for a system to communicate relay type configurations to configure relay services, in accordance with an illustrative embodiment.

Referring now to FIG. 4, depicted is a sequence diagram of a procedure 400 for the system 300 for communicating relay type configurations to configure relay services between the first UE 320A and the second UE 320B. Under the procedure 400, the first UE 320A may be in coverage of the network 315 and radio resource control (RRC) connected mode. The second UE 320B can be in coverage or out of coverage of the network 315, and the second UE 320b can be in RRC connected mode or RRC inactive mode or RRC idle mode.

Before the first UE 320A broadcasts the relay type indication to the second UE 320B, the first UE 320A may report a supported relay type information (as UE capability information) towards network node 310 (405). Prior to the network configuring the first UE 320A with the relay types, the first UE 320A can also indicates a preference on the use of relay type towards network node 310 (410). The indication may identify which relay types the first UE 320A prefers to use in the following relay service (e.g., layer 2 relay and layer 3 relay). The network node 310 may return a relay type configuration (415). If the first UE 320A supports more than one relay type, (e.g., both layer 2 relay and layer 3 relay), the network node 310 can further configure the first UE 320A to use one or more relay types (e.g., layer 2 relay and layer 3 relay).

The first UE 320A may in turn broadcast relay type indication (420). The indication may identify whether the first UE 320A supports layer 2 relay or layer 3 relay. The indication can be carried within a discovery message or direct communication request message. The second UE 320B may select the most appropriate first UE 320A. The selection may be according to the currently supported relay type of the second UE 320B and the received relay type broadcast in the discovery message or direct communication request message. In some embodiments, when the second UE 320B triggers PC5-RRC/PC5-S connection setup, the second UE 320B can indicate its preferred relay type or supported relay type towards the first UE 320A (if the first UE 320A can support multiple relay types).

B. Frequency Lists to Identify Relay UE

Figure 5:
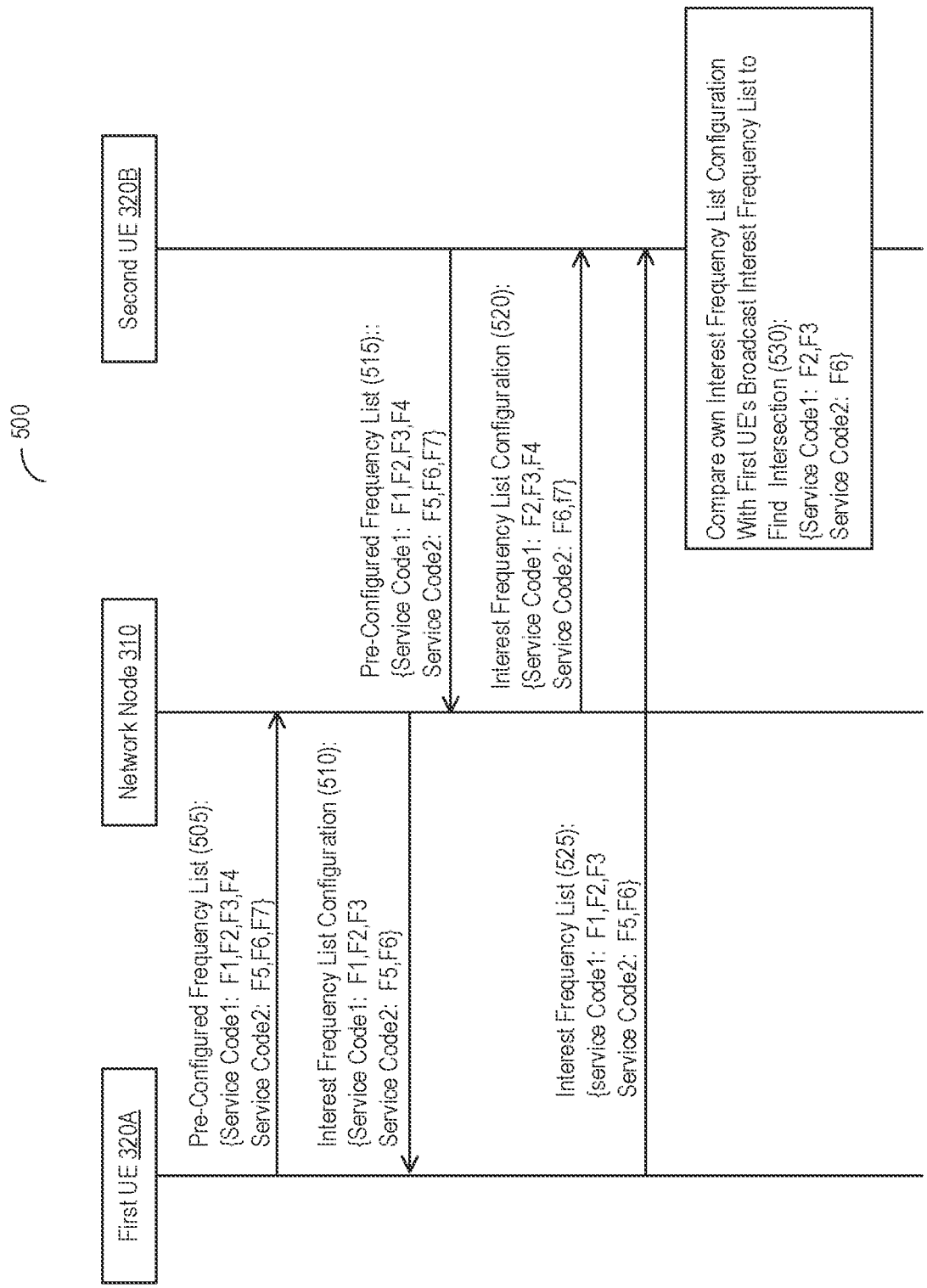
FIG. 5 illustrates a sequence diagram of an example procedure for a system for communicating frequency lists to configure relay services, in accordance with an illustrative embodiment.

Referring now to FIG. 5, depicted is a sequence diagram of a procedure 500 for the system 300 for communicating frequency lists to use in relay services between the first UE 320A and the second UE 320B. Under the procedure 500, the first UE 320A may be in coverage of the network 315 and RRC connected mode. The second UE 320B can be in coverage or out of coverage of the network 315, RRC connected mode, RRC inactive mode or RRC idle mode.

The first UE 320A can be pre-configured with a frequency list. The frequency list can be associated with different service code, or destination ID, or the first UE 320A's UE ID. The first UE 320A may report the pre-configured frequency list to network node 310 (505). In some embodiments, the reported frequency list may be associated with service code, or destination ID, or the first UE 320A's UE ID. After the first UE 320A reports the pre-configured frequency list to the network node 310, the network node 310 can configure and send an interested frequency list (510). The list may be associated with different service code, destination ID or UE ID. The interested frequency list may be selected among pre-configured frequency list.

In conjunction, if the second UE 320B is in coverage and RRC connected mode, the second UE 320B can also report pre-configured frequency list towards network node 310 (515). The second UE 320B may also be configured with interested frequency list from the network node 310 ((520). On the other hand, if the second UE 320B is out of coverage and is in RRC idle mode, the second UE 320B can use pre-configured frequency list. After receiving from the network node 310, the first UE 320A can broadcast the interested frequency list (525). In some embodiments, the interested frequency can be associated with different service codes, destination IDs or UE ID. The broadcasted frequency list can be carried in discovery message, or in a direct communication request message.

After receiving the first UE 320A's broadcasted interested frequency list, the second UE 320B may refer to the interested frequency list to select the most appropriate first UE 320As (530). In selecting, the second UE 320B may identify the first UE 320A of which the number of intersections of interested frequencies among the first UE 320A's interest frequency list and the second UE 320B's interest frequency list is as high as possible. In some embodiments, the second UE 320B may determine its own current service destination ID with highest QoS or default priority. The second UE 320B may select the first UE 320A which has largest intersection of interest frequencies targeted on this service destination ID.

C. Priority Information to Select Relay UE

In some embodiments, priority information may be used to select UEs for relay service. Under this approach, the first UE 320A may be in coverage of the network 315, and may be in RRC connected mode. The second UE 320B can be in coverage or out of coverage of the network 315, and may be in RRC connected mode, RRC inactive mode or RRC idle mode. The network node 310 can assign or configure each relay UE (e.g., first UE 320A) a with different priority value. For example, the smaller the value, the higher the priority may be. Conversely, the larger the value, the lower the priority may be. The priority value may indicate the first UE 320A's capability to serve as a relay UE is so that to be chosen as the relay UE for performing relay service. The priority value may be configured through a system information block (SIB) or RRC dedicated signaling, or downlink media access control (MAC) control element (CE), or within downlink control indication (DCI), among others.

In some embodiments, before the assignment of the priority value for the first UE 320A, the first UE 320A may report condition information to the network node 310. The condition information of the firs UE 320A may include one or more of the following: a remaining battery indication; a maximum number of PC5 link connections; a hop number (e.g., how many hops (or connecting UEs) the first UE 320A uses to connect to network node 310); PC5 link service priority; current existing PC5 link connections; current speed (e.g., data transmission rate); and channel busy ratio (CBR) measurement on Sidelink transmission resource pool, among others.

Upon receipt of the priority value configuration from the network node 310, the first UE 320A may broadcast or send the relay priority to other UEs including the second UE 320B. The relay priority can be through discovery message or direct communication request or response message. After receipt of the broadcast of priority value from the first UE 320A, if the first UE's PC5-RSRP measurement result is higher than the configured PC5-RSRP threshold, the second UE 320B can select the highest prioritized UE (e.g., the first UE 320A) according to the priority value.

D. QoS Information to Check UEs for Relay Service

In some embodiments, the quality of service (QoS) information may be used to select UEs for relay service. Under this approach, the first UE 320A is in coverage of the network 315 and may be in RRC connected mode. The second UE 320B can be in coverage or out of coverage of the network 315, and may be in RRC connected mode, RRC inactive mode or RRC idle mode. The network node 310 can configure the first UE 320A with QoS indication. In some embodiments, the QoS indication can be a white QoS flow identifier (QFI) list. The list may indicate that the first UE 320A can support relay service traffic with such QoS profile associated to each QFI. In some embodiments, the QoS indication can be a black QFI list. The list may indicate that the first UE 320A cannot support relay service traffic with such QoS profile associated to each QFI. In some embodiments, the QoS indication can be a default priority threshold defining a priority value at which to select the UE for relay service traffic. A default priority value which is above (or lower) than the configured default priority threshold can be supported for relay service traffic by the first UE 320A.

The QoS indication can be QoS profile, QoS flow identifier, default priority value. The QoS indication can be configured through SIB, RRC message, downlink MAC CE or DCI, among others. After network node 310 configures the first UE 320A with the QoS indication, the first UE 320A may broadcast the QoS indication. The QoS indication can be broadcast within discovery message or direct communication request message. After receipt of the broadcast QoS indication, the second UE 320B may compare a QoS profile of the current service for the second UE 320B with the QoS indication from the first UE 320A, to check whether the first UE 320A can be selected.

E. Reference Signal Received Power (RSRP) Measurements to Select Relay Services

Figure 6:
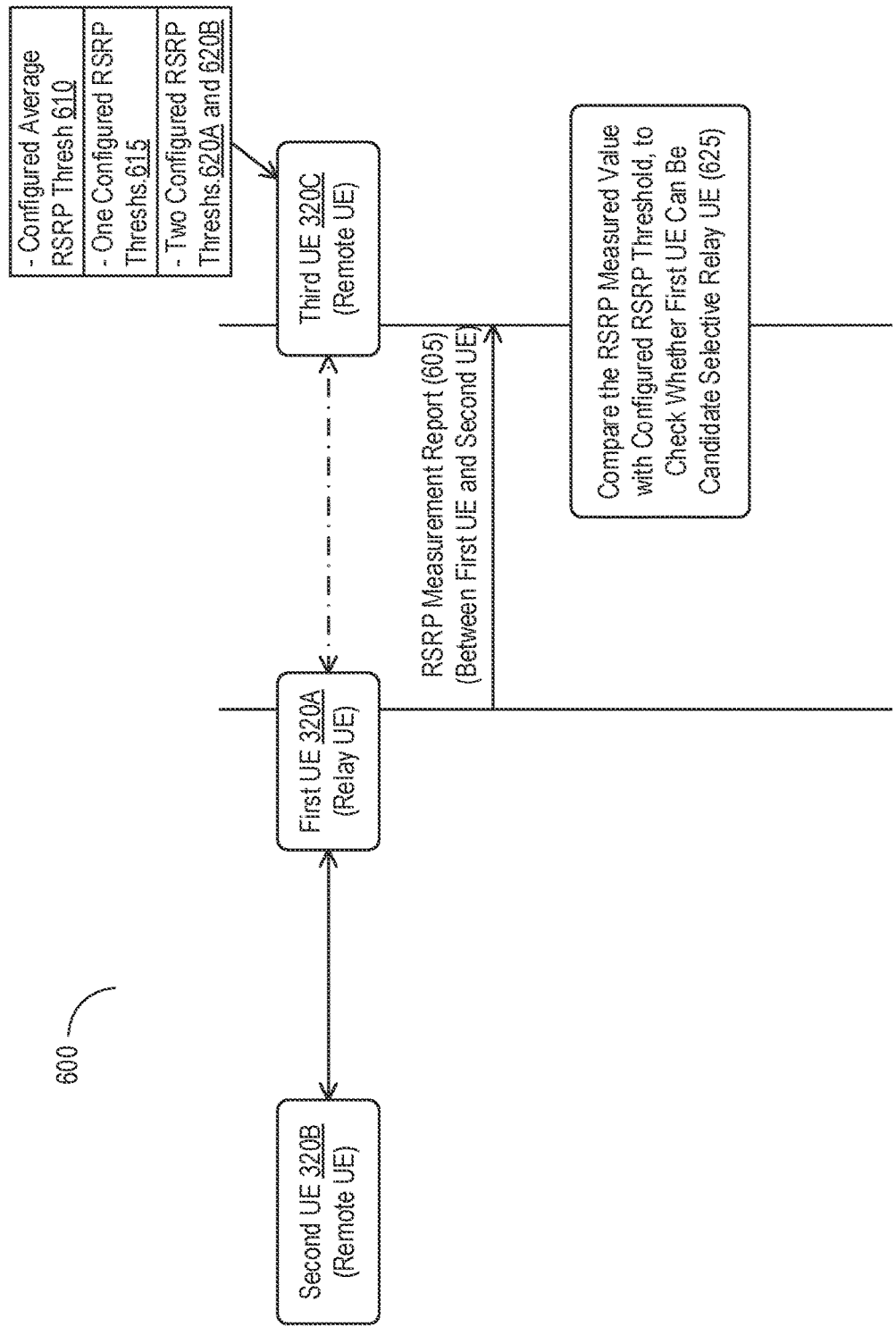
FIG. 6 illustrates a sequence diagram of an example procedure for a system for using reference signal received power (RSRP) measurements configure relay services, in accordance with an illustrative embodiment.

Referring now to FIG. 6, depicted is a sequence diagram of a procedure 600 for the system 300 for using RSRP measurements select UEs for relay services. For UE to UE relay scenario, the first UE 320A can be in coverage or out of coverage of the network 315, and may be in RRC connected mode, RRC inactive mode or RRC idle mode. The second UE 320B can be in coverage or out of coverage of the network 315, and may be in RRC connected mode, RRC inactive mode or RRC idle mode. The third UE 320C can be in coverage or out of coverage of the network 315, and may be in RRC connected mode, RRC inactive mode or RRC idle mode. The first UE 320A and the second UE 320B have already set up PC5-S/PC5-RRC connection, and the third UE 320C is performing relay UE selection.

The first UE 320A may report its RSRP measurement value for the link between first UE 320A and second UE 320B to the third UE 320C (605). The report can be within discovery message or direct communication request message. The report can be in accordance with a sidelink RRC message, a MAC CE, or selective control information (SCI). When the third UE 320C performs relay UE selection, the third UE 320C may also take the measurement of the link between the third UE 320C and the first UE 320A. The third UE 320C may take an overall consideration of RSRP measurement result of the two links for relay UE selection. The third UE 320C may use different techniques to take the RSRP measurement.

In some embodiments, an average RSRP threshold value 610 may be configured by the network node 310 connected to the third UE 320C, or may be pre-configured. After receipt of the RSRP measurement report from the first UE 320A for the link between the first UE 320A and the second UE 320B, the third UE 320C may perform the following calculation:

Average $RSRP$ Measurement =

$$\frac{RSRP(1stUE2ndUE) + RSRP(1stUE3rdUE)}{2}$$

The third UE 320C may then compare the average RSRP measurement result with the configured average RSRP threshold 610. If the average RSRP measurement result is higher than the configured average RSRP threshold 610, then the third UE 320C may include first UE 320A as a candidate selective relay UE. Upon comparing other measurements, the third UE 320C may select the highest measured UE (e.g., the first UE 320A) from the candidate UEs (625).

In some embodiments, an RSRP threshold value 615 may be determined or configured by the connected network node 310 connected to the third UE 320C, or may be pre-configured (denoted as RSRP Thresh). The third UE 320C may receive RSRP measurement report for the link between the first UE 320A and the second UE 320B from the first UE 320A (denoted as RSPR meas1). In addition, the third UE 320C may also measure the RSRP for the link between the first UE 320A and the third UE 320C (denoted as RSRP meas2). The third UE 320C may regard the first UE 320A as a candidate selective relay UE, only if RSRP meas1>=RSRP Thresh and RSRP meas2>=RSRP Thresh. Finally, the third UE 320C may, from among the candidates of relay UEs, select the UE (e.g., the first UE 320A) with highest RSRP meas1 or highest RSRP meas2 (625).

In some embodiments, two RSRP threshold values 620A and 620B may be determined or configured by the network node 310 connected to the third UE 320C or may be pre-configured (denoted as RSRP thresh1 and RSRP thresh2). The third UE 320C may receive the RSRP measurement report for the link between the first UE 320A and the second UE 320B from the first UE 320A (denoted as RSRP meas1). Moreover, the third UE 320C may also measure the RSRP for the link between the first UE 320A and the third UE 320C (denoted as RSRP meas2). The third UE 320C may regard the first UE 320A as a candidate selective relay UE only if RSRP meas1>=RSRP thresh1 and RSRP meas2>=RSRP thresh2. Finally, the third UE 320C may select, from among the candidates of relay UEs, the UE (e.g., the first UE 320A) with highest RSRP meas1 or highest RSRP meas2 (625).

F. Counteracting Failures in Connection Links

In some embodiments, UEs may perform a procedure to counteract against failures in connection links. For UE to UE relay scenario, the first UE 320A can be in coverage or out of coverage of the network 315, and may be in RRC connected mode, RRC inactive mode or RRC idle mode. The second UE 320B can be in coverage or out of coverage of the network 315, and may be in the RRC connected mode, RRC inactive mode or RRC idle mode. The third UE 320C can be in coverage or out of coverage of the network 315, and may be in RRC connected mode, RRC inactive mode or RRC idle mode. The first UE 320A and the second UE 320B have already set up a connection link (e.g., PC5-S/PC5-RRC connection). The third UE 320C may be performing relay UE selection.

Due to any number of reasons, the link (denoted as link1) between the first UE 320A and the second UE 320B may have a connection failure. In such a scenario, it may be meaningless for the first UE 320A and the third UE 320C to maintain the PC5-RRC/PC5-S link (denoted as link2), since the third UE 320C would like to communication with the second UE 320B. After the link1 enters a failure situation, the first UE 320A may indicate to the third UE 320C with link1 failure type information through PC5-RRC or Sidelink MAC CE carrying the indication of failure type (denoted link1 failure). In some embodiments, the destination ID identifying the third UE 320C can be carried within the link failure indication.

When the first UE 320A detects that the link quality for link2 (between the first UE 320A and the third UE 320C) is becoming poorer than a configured threshold, the first UE 320A may send the link quality information to the second UE 320B. The link quality information can contain one or more of the following: PC5 RSRP measurement result; or measurement CBR result for the link2 or link2 transmission resource pool, among others. In some embodiments, the first UE 320A may directly indicate the second UE 320B to perform relay UE reselection.

The failure type can be differentiated according to various reasons, such as: link 1 failure due to a radio link failure (RLF), indicating that link1 is failure due to the link quality is poor resulting in RLF; and link 1 failure due to Service Terminate, indicating that link1 is failure due to lack of any service transmission by the second UE 320B. The third UE 320C may receive the link failure indication from the first UE 320A, if the third UE 320C is in coverage and RRC connected mode. The third UE 320C may report the link2 failure information to the network node. The report can include the failure type.

G. Switching Network Relay Modes

Figure 7:
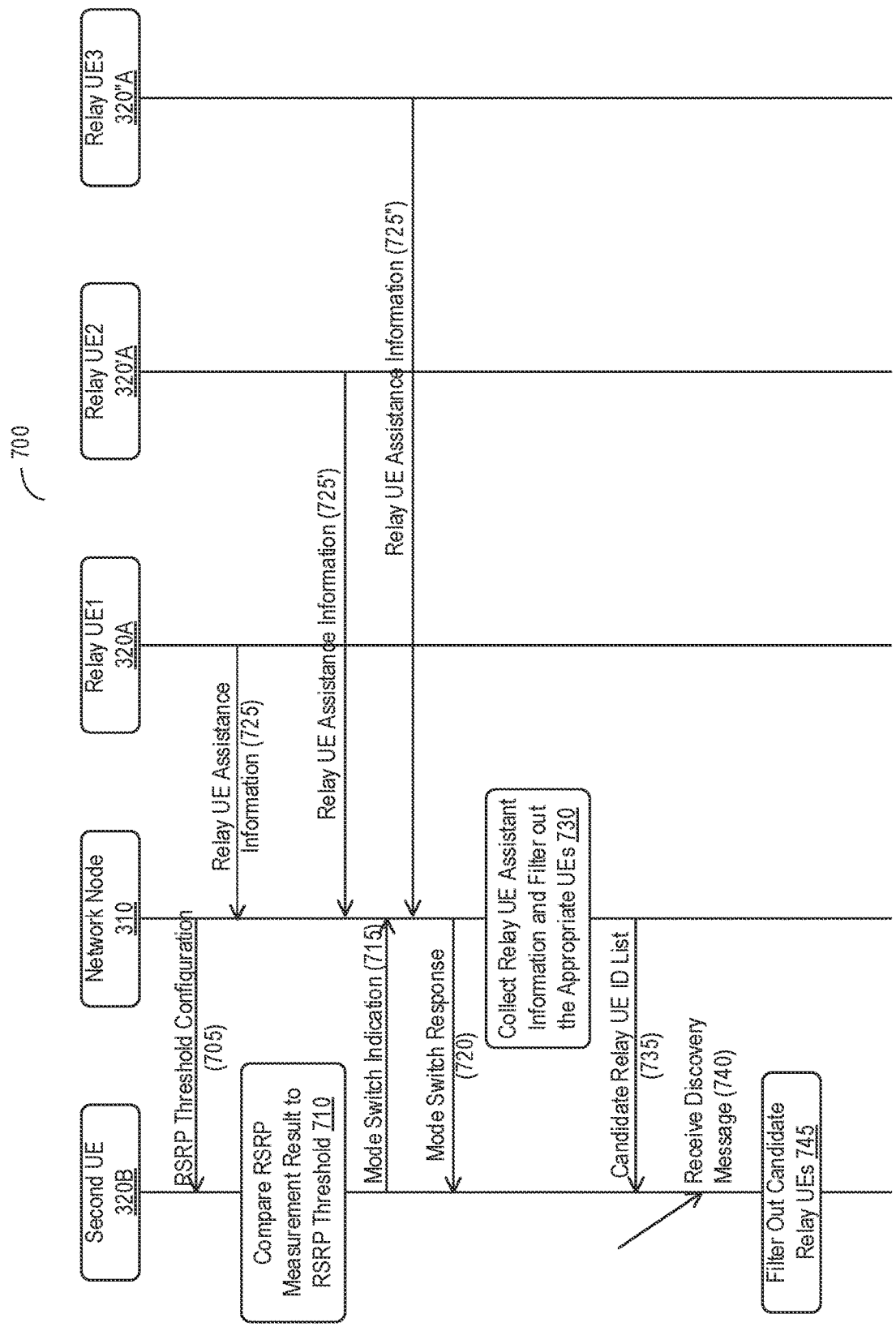
FIG. 7 illustrates a sequence diagram of an example procedure for a system for switching relay modes based on relay assistant information, in accordance with an illustrative embodiment.

Referring now to FIG. 7, depicted is a sequence diagram of a procedure 700 for the system 300 for switching network relay modes using relay UE assistant information. Each first UE 320A, 320'A, 320"A (generally herein referred to as UE 320A) may be in coverage of the network 315, and may be in RRC connected mode. The second UE 320B may be in coverage of the network 315, and may be in RRC connected mode.

The network node 310 will configure the second UE 320B with a RSRP threshold (705). The RSRP may be used to determine whether the UE is to switch from direct connecting to network node 310 to network relay mode. The RSRP threshold can be configured using different QoS profile, default priority level, or QFI, for example as the RSRP-Priority Threshold 1 and RSRP-Priority Threshold 2, among others.

After the second UE 320B receives the configured RSRP threshold, the second UE 320B may compare the configured threshold with its RSRP measurement result to decide whether to switch to network relay mode (715). If the RSRP threshold is configured with different QoS profile, default priority level, or QFI, the second UE 320B may check the RSRP threshold with QoS profile of the current service or highest default priority level.

When the determination is to switch from cellular interface (Uu) mode to network relay mode, the second UE 320B may send mode switch request to network node 310 (715). The mode switch request can be sent via dedicated RRC signaling, uplink MAC CE, or UCI. In some embodiments, upon receiving the mode switch request, network node 310 may respond with a mode switch response message (720). The response message may be sent via dedicated RRC signaling, downlink MAC CE, or DCI.

In conjunction, the first UEs 320A (also 320'A and 320"A) (also in coverage and RRC connected mode) may report its assistance information to network node 310 (725, 725', and 725"). The assistance information from each of the first UEs 320A may include one or more of the following: remaining battery indication; maximum number of PC5 link connection; a hop number referring by how network elements are between the first UE 320A and the network node 320 to connect to network node 310; PC5 link service priority; current existing PC5 link connection; current speed; and CBR measurement on sidelink transmission resource pool.

Subsequently, the network node 310 may will filter out the most appropriate the first UE 320A for the second UE 320B (730). The filtering out may be performed after receiving the assistant information from the first UEs 320A and the mode switch indication from the second UE 320B, or after responding with the mode switch response message. Once filtered out, the network node 310 may indicate the first UE 320A's UE ID to the second UE 320B (735). In some embodiments, network node 310 can filter out a group of appropriate first UE 320As, and indicate the group of first UE 320A's UE ID list to the second UE 320B. In some embodiments, the candidate relay UE ID list can be contained within mode switch response message. In some embodiments, the mode switch response can include at least one of the following information: concerned frequency list associated with each relay service or destination ID; relay service transmission resource pool configuration on each frequency; relay service Priority-CBR transmission parameter configuration list; relay service reception resource pool configuration on each frequency; and SLRB configuration for each relay service, among others.

Upon receipt of the list of the first UE 320A's UE ID(s), the second UE 320B may receive neighboring first UE 320A's discovery message (740). The second UE 320B may also filter out the first UE 320As which are within the configured UE ID list (745). From the filtering, the second UE 320B may select the first UE 320A as candidate relay UE. Among the candidate relay UE set, the second UE 320B will select the most appropriate first UE 320A as relay UE. In some embodiments, the second UE 320B can also firstly perform relay UE discovery and select a group of candidate relay UE list. Then, the second UE 320B may report the candidate relay UE list towards network node 310. After receipt of the second UE 320B's reporting candidate relay UE list, the network node 310 may facilitate the second UE 320B in selecting the final relay UE (e.g., the first UE 320A).

H. Load Balancing by Handing Off to Relay Service

Figure 8:
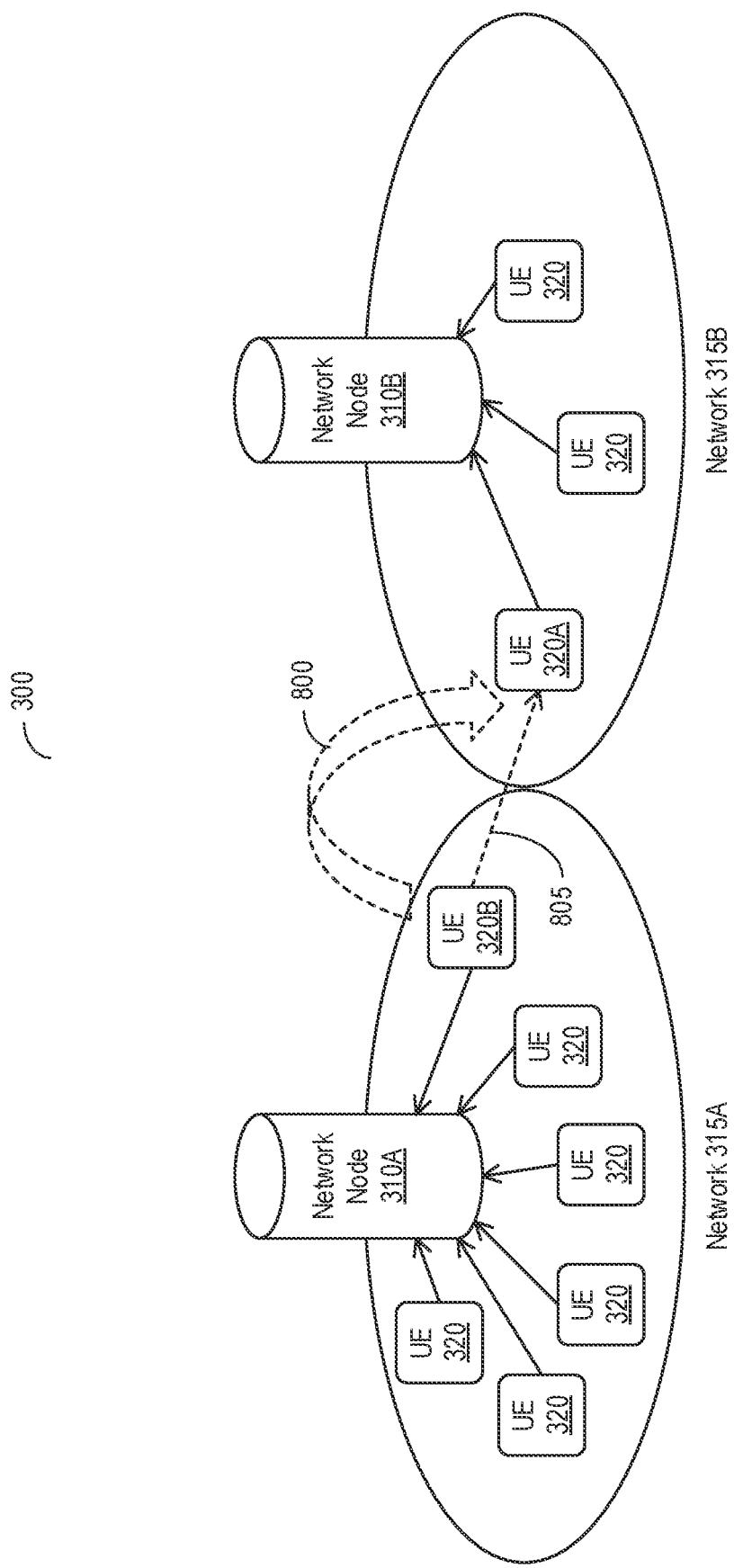
FIG. 8 illustrates a block diagram of a system performing load balancing by handing off to relay service, in accordance with an illustrative embodiment.

Referring now to FIG. 8, depicted is a block diagram of a system 300 performing load balancing 800 by handing off to relay service. The first UE 320A may be in coverage of the network 315A and may be in RRC connected mode. The second UE 320B may be in coverage of the network 315B, and may be in RRC connected mode. For load balance consideration, in some cases, the load of one network node 310A may be relatively more full, but the neighboring network nodes (e.g., network node 310B) may still has network capacity. In this scenario, network node 310A may request a second UE 320B to change to network relay mode (805). The second UE 320B may connect to the first UE 320A that is serviced or controlled by the neighboring network node 310B.

Figure 9:
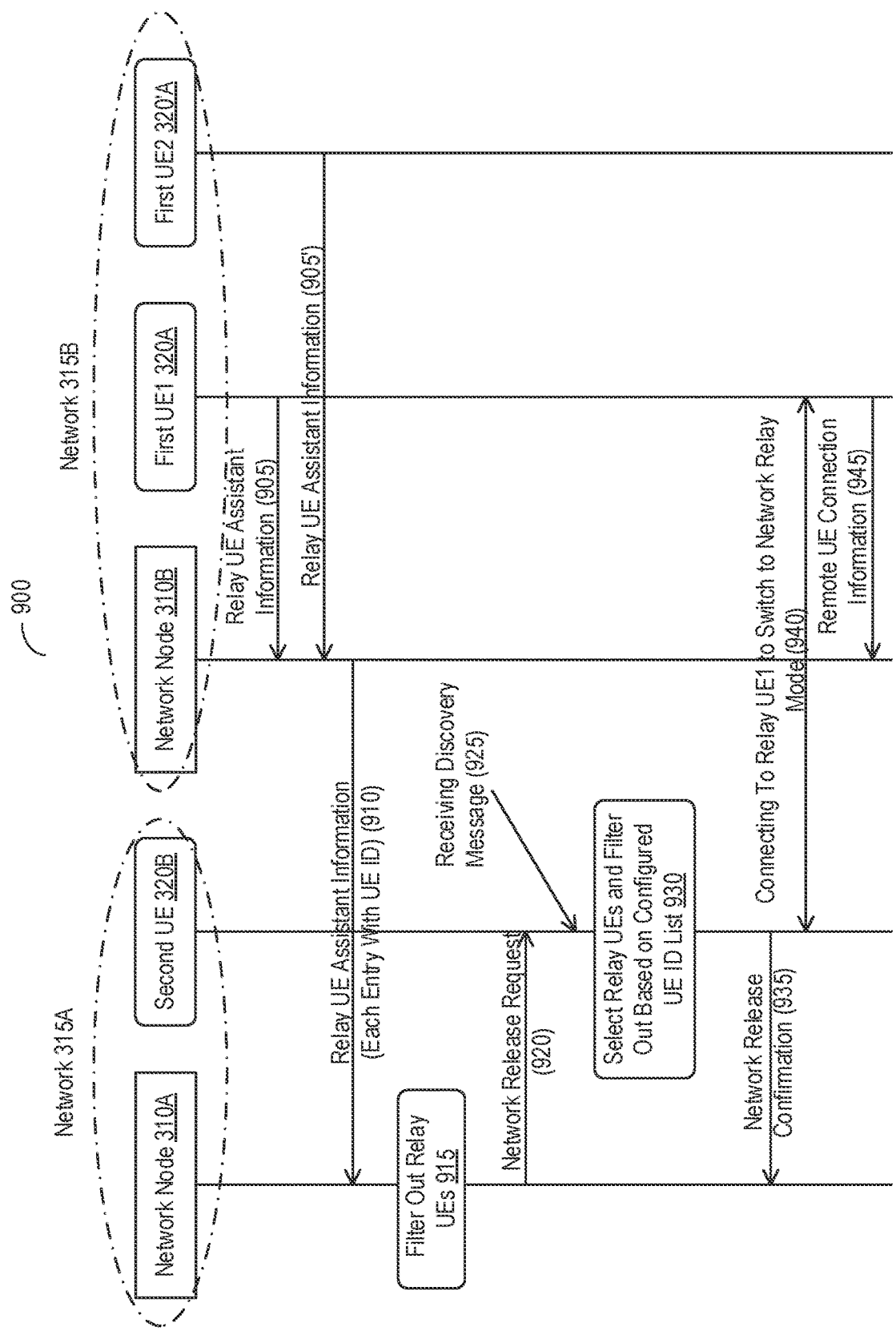
FIG. 9 illustrates a sequence diagram of an example procedure for a system for load balancing by handing off to relay service, in accordance with an illustrative embodiment.

Referring now to FIG. 9, depicted is a sequence diagram of a procedure 900 for the system 300 for load balancing by handing off to relay service. Under procedure 900, the network node 310A may collect the assistance information from the first UEs 320A and 320'A (905 and 905'). The first UEs 320A and 320'A may be under the control the network node 310B. The network node 310A may receive the assistant information collected by the network node 310B. The assistance information may be associated with the UE ID through a Xn/X2 interface transmitted by the neighboring network node 310B.

In some embodiments, if network node 310A has received the second UE 320B's selected candidate relay UE ID list through relay discovery, the network node 310A may report the candidate relay UE ID list to the neighboring network node 310B via Xn/X2 interface (910). After receipt of the relay UE ID list, the network node 310A may filter out which relay UE(s) are under coverage of the network 315A (915). The network node 315A may select the most appropriate relay UE (e.g., the first UE 320A) for the second UE 320B. In some embodiments, the network node 310B may send the final selected relay UE ID towards network node 310A, associated with the condition information of the relay UE. In some embodiments, the network node 310A may receive multiple relay UE IDs via different neighboring cells. In some embodiments, the network node 310A may select the most appropriate relay UE and indicate to the second UE 320B.

The network node 310A may send relay UE handover request message to the second UE 320B (920). The relay UE handover request message may include one or more of the following: a RRC release cause value (e.g., networkOverload); a mode switch request (from Uu connection to network relay connection); a candidate relay UE ID with Cell ID (e.g., NR Cell Global Identity (NCGI) or Evolved Terrestrial Radio Access Network (E-UTRAN) Cell Global Identification (ECGI)); and a candidate relay UE ID list, among others. In the UE ID list, each relay UE ID may be associated with cell ID NCGI or ECGI. In some embodiments, the relay UE handover request message can be sent via RRC dedicated signaling, downlink MAC CE, or DCI, among others.

After receipt of the network release message, the second UE 320B may perform sidelink discovery to find the first UE 320As which are near to the second UE 320B (925). In addition, the second UE 320B may filter out the first UE 320A or 320'A that are on the configured relay UE ID list as candidate relay UEs. Prior to, in conjunction with, or subsequent to sidelink discovery, the second UE 320B may send network release confirmation to the network node 310A. The network release confirmation message may include one or more of the following: a confirmation indication and final selected relay UE ID, among others. In some embodiments, the release confirmation message can be sent via RRC dedicated signaling, uplink MAC CE, UCI.

In conjunction, the second UE 320B may initiate PC5 connection with the final selected relay UE (e.g., the first UE 320A) (940). After the PC5 connection setup, the final selected relay UE (e.g., the first UE 320A) may send remote UE connection information to the network node 310A.

I. Relay Re-Selection and Path Switching

Under one scenario, the first UE 320A may be a L2 UE-to-Network relay UE. The second UE 320B may be a remote UE, and may connect to network node 310 via the first UE 320A. It may be better for the second UE 320B to monitor network (NW) system information block (SIB) messages for relay reselection or path switch to direct Uu, when the PC5 link quality between the second UE 320B and the first UE 320A is poor. For the second UE 320B to acquire NW SIB messages, the following may be considered.

The second UE 320B may send a SIB request message to the first UE 320A to request the first UE 320A forwarding NW SIB messages. The SIB request message may be sent via PC5-RRC message. The SIB request message may include at least one of the following: a SIB forwarding indication, required SIB list, and forwarding mode. The forwarding mode of the SIB request message may indicate that the second UE 320B is to expect the first UE 320A to forward NW SIB messages via a sidelink master information block (SL-MIB), broadcast, unicast or PC5-RRC message. Upon receiving the SIB request message, the first UE 320A can determine to forward the requested NW SIB messages received from NW (e.g., the network node 310) to the second UE 320B. The first UE 320A can forward the requested NW SIB messages via PC5-RRC message, unicast, broadcast or SL-MIB.

In some embodiments, before the second UE 320B sends SIB request message to the first UE 320A, the first UE 320A can indicate the valid SIB list to the second UE 320B. The SIB list may include the SIB messages received from NW. If the SIB the second UE 320B intends to request is included in the valid SIB list indicated by the first UE 320A, the second UE 320B can request the first UE 320A to forward the SIB message to the second 320B. Otherwise, the second UE 320B can request the NW to send the SIB messages via RRC dedicated signaling via the first UE 320A.

J. Configuring RRC States of UE

The first UE 320A may be a L2 UE-to-Network relay UE. The second UE 320B may be a remote UE that connects to the network node 310 via the first UE 320A. When there is no data to communicate (e.g., transmit or receive) via the network 315, the network node 310 can configure the second UE 320B to enter into RRC inactive or RRC idle state. When the second UE 320B is in RRC inactive or idle state, the first UE 320A can facilitate monitoring of a paging message for the second UE 320B and forward the paging message to the second UE 320B.

For the first UE 320A to monitor and forward the paging message to the second UE 320B, the first UE 320A may identify the UE ID for the second UE 320B (e.g., 5G short temporary mobile subscriber identity (S-TMSI), or 5G-S-TMSI mod 1024) and the Uu DRX configuration of the second 320B. The second UE 320B can send the information to the first UE 320A when the second UE 320B enters into RRC idle or inactive state (receiving RRC release or configuration from NW). The NW (e.g., the network 315 or network node 310) can send the above information to the first UE 320A when the NW decides to configure the second UE 320B to enter RRC idle or inactive state.

The first UE 320A may identify the RRC state of the second UE 320B. With the identification, the first UE 320 may monitor the paging message for the second UE 320B when the second UE 320B is in RRC idle or inactive state. When the RRC state of the second UE 320B is transitioning, the second UE 320B may inform the first UE 320A. The second UE 320B may inform the first UE 320A with one or more of the following: RRC state indication (e.g., RRC connected, idle, or inactive state), and paging monitor or forwarding indication. In some embodiments, when the NW determines to configure the second UE 320B to transit to a new RRC state, the NW may inform the first UE 320A. The NW may send the RRC state of the second UE 320B or the paging monitor or forward indication for the second UE 320B to the first UE 320A.

K. The Condition for Relay UE to Enter RRC Connected Mode

The first UE 320A may be in coverage of the network 315, RRC idle or RRC inactive mode. The second UE 320B can be in coverage or out-of-coverage. The network node 310 may send transmission resource pool used for the first UE 320A transmitting sidelink discovery message within relay UE initiation configuration via SIB. However, in AS layer, there may be no dedicated discovery physical channel. Thus, there may be no way to differentiate among sidelink discovery message, normal data packet, and other PC5-S/PC5-RRC signaling. As a consequence, the first UE 320A may not only use the configured transmission resource pool for sidelink discovery message transmission, but also use the resource pool for data transmission and PC5 signaling transmission, where it is not network's original intention. In this case, in AS layer, there should be some way to recognize discovery message.

In some embodiments, one SL-SRB may be used to map to sidelink discovery message. When the network node 310 configures the sidelink transmission resource pool used only for discovery message transmission in SIB, the transmission resource pool may be associated with the specific SL-SRB index. In some embodiments, sidelink discovery message may be associated to one specific QoS profile, or QFI. When the network node 310 configures the sidelink transmission resource pool used only for discovery message transmission in SIB, the transmission resource pool may be associated with the specific QoS profile or QFI.

In some embodiments, to differentiate sidelink relay service and sidelink V2X service, different destination IDs can be used. Thus, when the network node 310 configures sidelink transmission resource pool used only for discovery message transmission in SIB, the transmission resource pool may be associated with specific destination IDs which are used to indicate sidelink relay service.

On the other hand, network node 310 may not configure any transmission resource pool in SIB for the first UE 320A's relay initiation. Alter the first UE 320A's receiving of network's relay UE initiation configuration and determination that itself can become a relay UE, the first UE 320 may access into RRC connected mode to acquire sidelink transmission resource pool to transmit sidelink discover message (e.g., one condition for relay UE entering RRC connected mode is added). When the first UE 320A receives relay UE initiation configuration via SIB and determines itself can become a relay UE, the first UE 320A may enter the RRC connected mode.

L. Method for Relay Service

Figure 10:
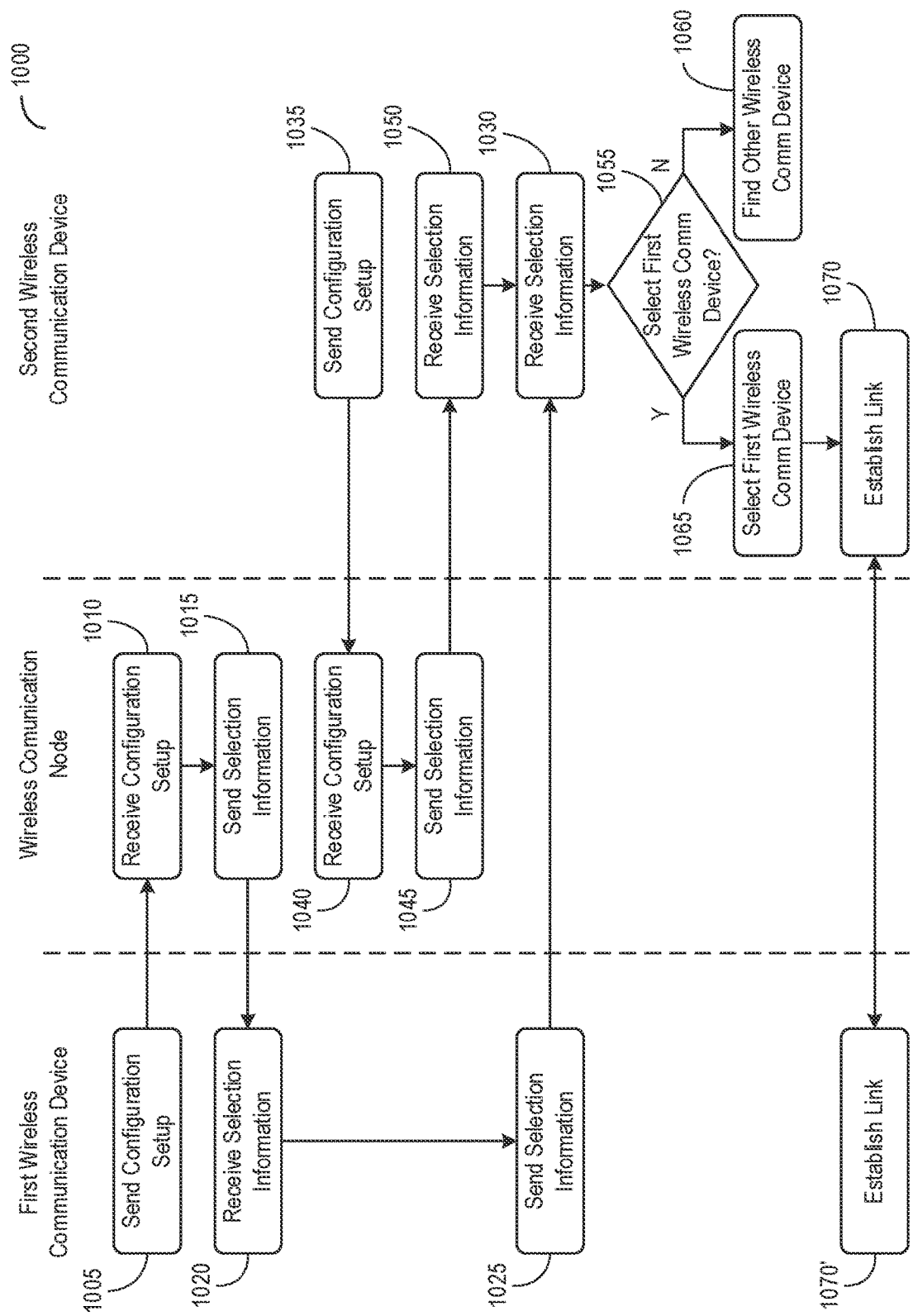
FIG. 10 illustrates a flow diagram of an example method for relay services, in accordance with an illustrative embodiment.

Referring now to FIG. 10, depicted is a functional band diagram of a method 1000 for relay service. The method 1000 may be performed by or implemented using any of the components detailed herein in conjunction with FIGS. 1-9, such as the network node 310, the network 315, the first UE 320A, and the second UE 320B. In brief overview, a first wireless communication device may send a configuration setup (1005). A wireless communication node may receive the configuration setup (1010). The wireless communication node may send selection information (1015). The first wireless communication device may receive the selection information (1020). The first wireless communication device may send the selection information (1025). A second wireless communication device may receive selection information from the first wireless communication device (1030). The second wireless communication device may send a configuration setup (1035). The wireless communication node may receive the configuration setup (1040). The wireless communication node may send selection information (1045). The second wireless communication device may receive the selection information from the wireless communication node (1050). The second wireless communication device may determine whether to select the first wireless communication device as a relay device (1055). If not selected, the second wireless communication device may find another wireless communication device (1060). If selected, the second wireless communication device may select the first wireless communication device as the relay device (1065). The second wireless communication device may establish a link with the first wireless communication device (1070 and 1070').

In further detail, a first wireless communication device (e.g., the first UE 320A) may provide, transmit, or otherwise send a configuration setup to a wireless communication node (e.g., the network node 310) (1005). The first wireless communication device may be within or outside coverage of a network (e.g., the network 315) maintained and provided by the wireless communication node. The configuration setup may indicate one or more properties, attributes, or characteristics regarding the first wireless communication device in relation to supporting relay services with a second wireless communication device (e.g., the second UE 320B). The second wireless communication device may be within or outside the coverage of the network maintained and provided by the wireless communication node. The first wireless communication device and the second wireless communication device may be located or positioned within a vicinity of each other (e.g., within transmission range). In some embodiments, the first wireless communication device may determine or identify the one or more properties, attributes, or characteristics. Based on the identification, the first wireless communication device may generate the configuration setup for provision to the wireless communication node.

In some embodiments, the configuration setup sent by the first wireless communication device may identify or include a set of relay types supported during a relay discovery or connection setup process. In some embodiments, the first wireless communication device may send a set of relay types supported during a relay discovery or connection setup process to the wireless communication node. The relay types may include, for example, a layer 2 relay or a layer 3 relay, or both. In some embodiments, the first wireless communication may send a preference for one or more of the relay types supported to the wireless communication node. The preference may identify at least one of the layer 2 relay or the layer 3 relay, or both.

In some embodiments, the configuration setup may identify or include a frequency list with which the first wireless communication device is configured. In some embodiments, the first wireless communication device may send the frequency list to the wireless communication node. The frequency list may include one or more frequencies preconfigured for the first wireless communication device to support relay services. In some embodiments, the frequency list may be associated with a service code, a destination identifier, or an identifier for the first wireless communication device.

In some embodiments, the configuration setup may identify or include relay assistance information. In some embodiments, the first wireless communication device may send the relay assistance information to the wireless communication node. The relay assistance information may identify or include one or more of the following: remaining battery indication; maximum number of PC5 link connection; a hop number referring by how network elements are between the first and the wireless communication node to connect to wireless communication node; PC5 link service priority; current existing PC5 link connection; current speed; and CBR measurement on sidelink transmission resource pool, among others. The relay assistance information may be associated with an identifier for the first wireless communication device. In some embodiments, the first wireless communication device may send the assistance information to another wireless communication node (e.g., network node 310B) via an air interface (e.g., Xn or X2 interface) of the wireless communication node (e.g., network node 310A).

The wireless communication node may retrieve, identify, or otherwise receive the configuration setup from the first wireless communication device (1010). In some embodiments, the wireless communication node may receive the set of relay types supported by the first wireless communication device during a relay discovery or connection setup process from the first wireless communication device. In some embodiments, the wireless communication node may receive the preference for one or more of the relay types supported to the wireless communication node from the first wireless communication device. In some embodiments, the wireless communication node may receive the relay assistance information from the first wireless communication device.

The wireless communication node may provide, transmit, or otherwise send selection information to the first wireless communication device (1015). The selection information may be used for selection of a relay device for the second wireless communication device in determining whether to connect with the first wireless communication device as the relay device. Based on the configuration setup received from the first wireless communication device, the wireless communication node may identify, generate, or determine the selection information. In some embodiments, the type of selection information may depend on the type of information provided by the first wireless communication device in the configuration setup. In some embodiments, the type of selection information provided may be independent of the configuration setup from the first wireless communication device.

In some embodiments, the selection information may identify or include a configuration to configure the first wireless communication device with one or more of the relay types. The configuration may identify the relay types to be used by the first wireless communication device for the relay service. In some embodiments, the wireless communication node may send the configuration to configure the wireless communication device with one or more of the relay types. In some embodiments, the wireless communication node may select the one or more relay types from the set of relay types provided in the configuration setup.

In some embodiments, the selection information may identify or include a frequency-of-interest list. The frequency-of-interest list may identify or include one or more frequencies with which the first wireless communication device is to use for the relay service. In some embodiments, the wireless communication node may send the frequency-of-interest list to the first wireless communication device. In some embodiments, the wireless communication node may select the one or more frequencies for the frequency-of-interest list from the frequency list provided in the configuration setup.

In some embodiments, the selection information may identify or include priority information for the first wireless communication device. The priority information may identify or include a priority value indicating an order at which the first wireless communication device is to be selected for use as the relay service. In some embodiments, the wireless communication node may assign or determine the priority information for the wireless communication device based on any number of factors. The factors may include the relay assistance information provided by the first wireless communication device or measurements on the first wireless communication device performed by the wireless communication node. In some embodiments, the wireless communication node may send the priority information to the first wireless communication device.

In some embodiments, the selection information may identify, include, be related to quality-of-service (QoS) to be supported by the first wireless communication device to relay traffic. The wireless communication node may send the information about QoS to the first wireless communication device. In some embodiments, the information on QoS may identify or include a white QoS flow identifier (QFI) list. The white QFI list may identify or include one or more QFIs corresponding to different QoS profiles to be permitted for relay services. In some embodiments, the information about QoS may identify or include a black QFI list. The black QFI list may identify or include one or more QFIs corresponding to different QoS profiles to be restricted from providing relay services. In some embodiments, the information about QoS may include a priority threshold (e.g., a default priority threshold). The priority threshold may define or identify a priority value at which the corresponding wireless communication device is to be identified as supporting relay service traffic.

The first wireless communication device may retrieve, identify, or otherwise receive the selection information from the wireless communication node (1020). In some embodiments, the first wireless communication device may receive the configuration to configure the first wireless communication with one or more of the relay types to be used for the relay service. In some embodiments, the first wireless communication device may receive the frequency-of-interest list to configure the first wireless communication device. In some embodiments, the first wireless communication device may receive the priority information for the first wireless communication device. In some embodiments, the first wireless communication device may receive the information about QoS supported by the first wireless communication device to relay traffic. The information about QoS may identify or include one or more of: the white QFI list, the black QFI list, or the priority threshold, among others.

The first wireless communication device may forward, provide, or otherwise send the selection information to the second wireless communication device (1025). In some embodiments, the first wireless communication device may broadcast the selection information. Upon receipt of the selection information, the first wireless communication device may send or broadcast the selection information. The selection information may identify or include one or more of: the configuration of the relay types, the frequency-of-interest list, the priority information, and the information about QoS, among others. In some embodiments, the first wireless communication device may send an indication of the one or more of the relay types with which the first wireless communication device is configured. In some embodiments, the first wireless communication device may send the frequency-of-interest list to the second wireless communication device. In some embodiments, the first wireless communication device may send the priority information to the second wireless communication device. In some embodiments, the first wireless communication device may send the information about QoS supported by the first wireless communication device for relaying traffic.

The second wireless communication device may retrieve, identify, or otherwise receive the selection information from the first wireless communication device (1030). In some embodiments, the second wireless communication device may receive the selection information broadcast by the first wireless communication device. In some embodiments, the second wireless communication device may receive the information on the indication of the one or more relay types with which the first wireless communication device is configured for the relay service. In some embodiments, the second wireless communication device may receive the information identifying or including the frequency-of-interest list. In some embodiments, the second wireless communication device may receive the information identifying or including the priority information for the first wireless communication device. In some embodiments, the second wireless communication device may receive the information identifying or including the information on QoS supported by the first wireless communication device for relaying traffic.

In conjunction, the second wireless communication device may provide, transmit, or otherwise send a configuration setup to the wireless communication node (1035). In some embodiments, the second wireless communication device may be within the coverage of the network maintained and provided by the wireless communication node. The configuration setup may indicate one or more properties, attributes, or characteristics regarding the second wireless communication device in relation to connecting to relay services with another wireless communication device (e.g., the first UE 320A). In some embodiments, the second wireless communication device may transmit, provide, or send an indication to switch to relay services (e.g., the mode switch request) with another wireless communication device to the wireless communication node.

The configuration setup sent by the second wireless communication device may be similar to the configuration setup sent by the first wireless communication device to the wireless communication node. In some embodiments, the configuration setup may identify or include a frequency list with which the second wireless communication device is configured. In some embodiments, the first wireless communication device may send the frequency list to the wireless communication node. The frequency list may include one or more frequencies pre-configured for the second wireless communication device for connecting to relay services. In some embodiments, the frequency list may be associated with a service code, a destination identifier, or an identifier for the second wireless communication device.

The wireless communication node may retrieve, identify, or otherwise receive the configuration setup from the second wireless communication device (1040). In some embodiments, the wireless communication node may receive the frequency list from the second wireless communication device. In some embodiments, the wireless communication node may receive the indication to switch to relay services to another wireless communication device from the second wireless communication device.

The wireless communication node may provide, transmit, or otherwise send selection information to the second wireless communication device (1045). The selection information may be used for selection of a relay device for the second wireless communication device in determining whether to connect with another wireless communication device (e.g., first UE 320A) as the relay device. Based on the configuration setup received from the first wireless communication device or the second wireless communication device, the wireless communication node may identify, generate, or determine the selection information. In some embodiments, the type of selection information may depend on the type of information provided in the configuration setup. In some embodiments, the type of selection information provided may be independent of the configuration setup. In some embodiments, the selection information may include an indication of which wireless communication device to wirelessly connect with as the relay device.

In some embodiments, the selection information may identify or include a frequency-of-interest list. The frequency-of-interest list may identify or include one or more frequencies with which the second wireless communication device is to use for the relay service. In some embodiments, the wireless communication node may send the frequency-of-interest list to the second wireless communication device. In some embodiments, the wireless communication node may select the one or more frequencies for the frequency-of-interest list from the frequency list provided in the configuration setup from the second wireless communication device.

In some embodiments, the selection information may identify or include one or more identifiers of candidate relay devices for the second wireless communication device is to connect with for relay services. The wireless communication node may identify or select the one or more wireless communication devices in accordance with the relay assistance information received from the wireless communication devices. The selection may be in response to receipt of the indication to switch to relay services. In some embodiments, the wireless communication node may compare the relay assistance information with specifications (e.g., QoS or RSRP) for relay service. If the relay assistant information is determined to satisfy, the wireless communication node may include the identifier of the corresponding wireless communication device into the information. Otherwise, if the relay assistant information is determined to not satisfy, the wireless communication node may exclude the corresponding identifier. In some embodiments, the wireless communication node may send the one or more identifiers of the candidate relay devices to the second wireless communication device. In some embodiments, the information on the one or more identifiers of the candidate relay devices may be sent in a network release message to the second wireless communication device.

The second wireless communication device may retrieve, identify, or otherwise receive the selection information from the wireless communication node (1050). In some embodiments, the second wireless communication device may receive the indication of at least one wireless communication device (e.g., an identifier for UE 320A) to wirelessly connect with as the relay device. In some embodiments, the second wireless communication device may receive the frequency-of-interest list to configure the second wireless communication device. In some embodiments, the second wireless communication device may receive the information identifying or including one or more identifiers of candidate relay devices selected based on the assistance information. In some embodiments, the second wireless communication device may receive the one or more identifiers of the candidate relay devices in a network release message from the wireless communication node.

The second wireless communication device may determine whether to select the first wireless communication device to connect with as a relay device (1055). The selection may be in accordance with any number of factors, such as the indication of which wireless communication device to connect, supported relay types, the frequency-of-interest lists, the information on one or more identifiers of candidate relay devices, priority information, and information about QoS, among others.

In some embodiments, the second wireless communication device may determine whether to connect with the first wireless communication device in accordance with the indication. When the indication from the wireless communication node identifies the first wireless communication device, the second wireless communication device may determine to connect with the first wireless communication device as the relay service. Conversely, when the indication from the wireless communication node does not identify the first wireless communication device, the second wireless communication device may determine to not connect with the first wireless communication device as the relay service.

In some embodiments, the second wireless communication device may determine whether to connect with the first wireless communication device as the relay device according to the one or more supported relay types. The relay types may identify or include one or more of the relay types with which the first wireless communication device is configured. In addition, the relay types may identify or include one or more relay types that the second wireless communication device supports. When none of the relay types of the first wireless communication device matches with any of the relay types of the second wireless communication device, the second wireless communication device may determine to not select the first wireless communication device.

Conversely, when at least one of the relay types of the first wireless communication device matches one of the relay types of the second wireless communication device, the second wireless communication device may determine to select the first wireless communication device as the relay device. In some embodiments, the second wireless communication device may send an indication of the preferred relay type or supported relay type to the first wireless communication device. In turn, the first wireless communication device may receive the indication of the preferred relay type or supported relay type from the second wireless communication device. The preferred relay type or supported relay type may be used to establish the link between the first wireless communication device and the second wireless communication device.

In some embodiments, the second wireless communication device may determine whether to connect with the first wireless communication device as the relay device according to the frequency-of-interest list. The determination may be in accordance with the frequency-of-interest list from the first wireless communication device and the frequency-of-interest list from the wireless communication node. In some embodiments, the second wireless communication device may identify or select a wireless communication device with the greater number of frequencies-of-interest in common with the frequencies-of-interest of the second wireless communication device. In some embodiments, the second wireless communication device may identify or select a wireless communication device with the greater number of frequencies-of-interest in common with the frequencies-of-interest on a destination identifier corresponding to the second wireless communicate device with the highest QoS or priority. When the identified wireless communication device corresponds to the first wireless communication device, the second wireless communication device may select the first wireless communication device. Otherwise, when the identified wireless communication corresponds to another wireless communication, the second wireless communication device may select the other.

In some embodiments, the second wireless communication device may determine whether to connect with the first wireless communication device as the relay device according to the priority information. The priority information may indicate a precedence or order of the wireless communication devices with which the second wireless communication device can connect for relay services. The selection may be based on whether the first wireless communication device has a highest priority among the candidate relay devices. When the first wireless communication device has the highest priority, the second wireless communication device may select the first wireless communication device as the relay device. Otherwise, when the first wireless communication device does not have the highest priority, the second wireless communication device may not select the first wireless communication device.

In some embodiments, the second wireless communication device may determine whether to connect with the first wireless communication device as the relay device according to the information on QoS. The selection may be based on the QoS profile of the relay traffic supported by the white QFI list or the QoS profile excluded by the black QFI list. When the QoS profile is supported by the white QFI list or not included in the black QFI list, the second wireless communication device may select the first wireless communication device as the relay service. Otherwise, when the QoS profile is not supported by the white QFI list or is included in the black QFI list, the second wireless communication device may not select the first wireless communication device as the relay service. The selection may be based on the first wireless communication device having a priority level satisfying the priority threshold defined by the information on QoS.

In some embodiments, the second wireless communication device may determine whether to directly connect with a relay device in a network relay mode. The determination may be based on a comparison between a RSRP threshold and an RSRP measurement of the connection between the second wireless communication device and the wireless communication node. When the RSRP measurement does not satisfy the threshold, the second wireless communication device may determine to directly connect with the relay device in the network relay mode. Otherwise, when the RSRP measurement does satisfy the threshold, the second wireless communication device may determine to not connect with the relay device in the network relay mode.

In some embodiments, the second wireless communication device may determine whether to connect with the first wireless communication device as the relay device according to the one or more identifiers of candidate relay devices selected by the wireless communication node. The determination may be in response to the determination to directly connect with the relay device in the network relay mode. In some embodiments, the second wireless communication device may perform a discovery to identify one or more wireless communication devices. When the identifier for the first wireless communication device matches with one of the one or more identifiers of the candidate relay devices, the second wireless communication device may select the first wireless communication device as the relay service. Otherwise, when the identifier for the first wireless communication device does not match with any of the one or more identifiers of the candidate relay devices, the second wireless communication device may determine not to select the first wireless communication device.

If not selected, the second wireless communication device may identify or find another wireless communication device to connect with for relay services (1060). The other wireless communication device may identify in accordance to the functionalities described above. For example, when the first wireless communication device does not have the highest priority, the second wireless communication device may select the wireless communication device with the highest priority to use for relay services. Otherwise, the second wireless communication device may select the first wireless communication device as the relay device (1065). The selection may be in the manner as described above.

The second wireless communication device may establish a link with the first wireless communication device (1070 and 1070'). The link may be established between the first wireless communication device and the second wireless communication device for relay services. In establishing the link, the second wireless communication device may cease direct connection with the wireless communication node. Upon the establishment of the link, the second wireless communication device may communicate with the wireless communication node via the first wireless communication device.

In some embodiments, the first wireless communication device may provide, transmit, or otherwise send measurement information (e.g., RSRP measurement) to a third wireless communication device (e.g., UE 320C). The measurement information may be for the link between the first wireless communication device and the second wireless communication device. The third communication device may be within or outside the coverage of the network of the wireless communication node. Using the measurement information, the third wireless communication device may determine whether to include the first wireless communication device as a candidate relay device.

In some embodiments, the determination may be in accordance with the measurement information and a measurement threshold (e.g., average RSRP threshold). When the measurement information satisfies the threshold, the third wireless communication device may select the first wireless communication device as the candidate relay device. Otherwise, when the measurement information does not satisfy the threshold, the third wireless communication device may not select the first wireless communication device as the candidate relay device.

In some embodiments, the determination may be in accordance with the measurement information between the first wireless communication device and the second wireless communication, a threshold (e.g., a configured RSRP threshold), and a measurement information between the first wireless communication device and the third wireless communication device. When the measurement information between the first wireless communication device and the third wireless communication device and the measurement information between the first wireless communication device and the second communication device satisfy the threshold, the third wireless communication device may select the first wireless communication device as the candidate relay device. Otherwise, the third wireless communication device may not select the first wireless communication device as the candidate relay device.

In some embodiments, the determination may be in accordance with the measurement information between the first wireless communication device and the second wireless communication, measurement information between the first wireless communication device and the third wireless communication device, and thresholds (e.g., a RSRP threshold) for the respective links. When the measurement information between the first wireless communication device and the third wireless communication device and the measurement information between the first wireless communication device and the second communication device satisfy the respective thresholds, the third wireless communication device may select the first wireless communication device as the candidate relay device. Otherwise, the third wireless communication device may not select the first wireless communication device as the candidate relay device.

In maintaining the link, the first communication device may monitor a quality of the connection in the link between the first wireless communication device and the second wireless communication device. From monitoring, in some embodiments, the first wireless communication device may identify or determine a failure in the link. In response to determination of the failure, the first wireless communication device may send an indication of the failure to the third wireless communication device or the wireless communication node. In some embodiments, the first wireless communication device may calculate, identify, or determine a degradation in the link beyond a threshold. When the degradation is greater than the threshold, the first wireless communication device may send link quality information of the link to the third wireless communication device or the wireless communication node.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method, comprising:
    sending, by a second wireless communication device in vicinity of a first wireless communication device, a configuration setup to support relay services to a wireless communication node;
    receiving, by the second wireless communication device, information to be used for selection of a relay device, the information generated by the wireless communication node based on the configuration setup; and
    determining, by the second wireless communication device, whether to wirelessly connect with the first wireless communication device as the relay device.

2. The method of claim 1, wherein determining, by the second wireless communication device, whether to select the first wireless communication device as the relay device comprises:
    receiving, by the second wireless communication device from the wireless communication node, an indication of at least one wireless communication device to wirelessly connect with as the relay device; and
    determining, by the second wireless communication device according to the indication, to select with the first wireless communication device to wirelessly connect with as the relay device.

3. The method of claim 1, wherein the first wireless communication device is configured to:
    send to the wireless communication node at least one relay type supported, the at least one relay type comprising at least one of: layer 2 relay or layer 3 relay;
    send to the wireless communication node a preference for one or more of the at least one relay type supported;
    receive from the wireless communication node a configuration to configure the first wireless communication device with one or more of the at least one relay type;
    send to the second wireless communication device, an indication of the one or more of the at least one relay type with which the first wireless communication device is configured; and
    receive from the second wireless communication device, an indication of a preferred relay type or a supported relay type.

4. The method of claim 3, comprising:
    receiving, by the second wireless communication device, the information from the first wireless communication device, the information comprising an indication of the one or more of the at least one relay type with which the first wireless communication device is configured; and
    determining, by the second wireless communication device, according to one or more relay types that the second wireless communication device supports, and according to the indication of the one or more of the at least one relay type with which the first wireless communication device is configured, to select with the first wireless communication device to wirelessly connect with as the relay device.

5. The method of claim 1, wherein the first wireless communication device is configured to:
send, to the wireless communication node, a frequency list with which the first wireless communication device is configured;
receive, from the wireless communication node, a frequency-of-interest list selected from the frequency list to configure the first wireless communication device; and
send, to the second wireless communication device, the frequency-of-interest list.

6. The method of claim 5, comprising:
receiving, by the second wireless communication device, the information from the first wireless communication device, the information comprising the frequency-of-interest list; and
determining, by the second wireless communication device, to select the first wireless communication device to wirelessly connect with according to the frequency-of-interest list.

7. The method of claim 6, comprising:
selecting, by the second wireless communication device, as the relay device, a wireless communication device with a greatest number of frequencies-of-interest in common with frequencies-of-interest of the second wireless communication device, or in common with frequencies-of-interest targeted on a service destination identifier of the second wireless communication device that has a highest quality-of-service (QoS) or priority.

8. The method of claim 1, wherein the first wireless communication device is configured to:
receive from the wireless communication node, priority information for the first wireless communication device; and
send to the second wireless communication device, the priority information.

9. The method of claim 8, comprising:
receiving, by the second wireless communication device, the information from the first wireless communication device, the information comprising the priority information for the first wireless communication device; and
determining, by the second wireless communication device, to select the first wireless communication device to wirelessly connect with, according to the priority information, whether the first wireless communication device has a highest priority among candidate relay devices.

10. The method of claim 1, wherein the first wireless communication device is configured to:
receive from the wireless communication node, information about quality-of-service (QoS) supported by the first wireless communication device to relay traffic, comprising at least one of: a white QoS flow identifier (QFI) list, a black QFI list or a default priority threshold; and
send to the second wireless communication device, the information about QoS supported by the first wireless communication device to relay traffic.

11. The method of claim 10, comprising:
receiving, by the second wireless communication device, the information from the first wireless communication device, the information comprising the information about QoS supported by the first wireless communication device to relay traffic; and
determining, by the second wireless communication device, to select the first wireless communication device to wirelessly connect with, according to the first wireless communication device having at least one QoS profile of relay traffic supported by the white QFI list or excluded by the black QFI list, or according to the first wireless communication device having a priority value that satisfies the default priority threshold.

12. The method of claim 1, wherein the first wireless communication device is configured to:
send to a wireless communication node, assistance information of the first wireless communication device.

13. The method of claim 12, comprising:
determining, by the second wireless communication device, whether to directly connect with the relay device in network relay mode;
receiving, by the second wireless communication device, the information from the wireless communication node, the information comprising one or more identifiers of candidate relay devices selected according to assistance information of wireless communication devices corresponding to the candidate relay devices; and
determining, by the second wireless communication device according to the one or more identifiers of candidate relay devices, to select the first wireless communication device to wirelessly connect with as the relay device.

14. The method of claim 1, wherein the wireless communication node sends assistance information of the first wireless communication device to a second wireless communication node via an Xn or X2 interface of the first wireless communication node.

15. The method of claim 14, comprising:
receiving, by the second wireless communication device in a network release message, the information from the wireless communication node, the information comprising one or more identifiers of candidate relay devices selected according to at least the assistance information of the first wireless communication device; and
determining, by the second wireless communication device according to the one or more identifiers of candidate relay devices, to select the first wireless communication device to wirelessly connect with as the relay device.

16. The method of claim 1, wherein the first wireless communication device is configured to send to a third wireless communication device, a reference signal received power (RSRP) measurement of a link between the first wireless communication device and the second wireless communication device, and
wherein the third wireless communication device is configured to determine whether to include the first wireless communication device as a candidate relay device, according to the RSRP measurement and a configured average RSRP threshold.

17. The method of claim 1, wherein the first wireless communication device is configured to send to a third wireless communication device, a reference signal received power (RSRP) measurement of a link between the first wireless communication device and the second wireless communication device, and
wherein the third wireless communication device is configured to determine whether to include the first wireless communication device as a candidate relay device, according to a threshold, the RSRP measurement, and a RSRP measurement of a link between the first wireless communication device and the third wireless communication device.

18. A method, comprising:
sending, by a first wireless communication device in vicinity of a second wireless communication device, a configuration setup to support relay services to a wireless communication node;
receiving, by the first wireless communication device, information to be used for selection of a relay device generated by the wireless communication node;
sending, by the first wireless communication device, the information to be used for selection of the relay device to the second communication device, and
causing the second wireless communication device to determine whether to wirelessly connect with the first wireless communication device as the relay device.

19. A second wireless communication device, comprising:
at least one processor configured to:
send, via a transmitter in vicinity of a first wireless communication device, a configuration setup to support relay services to a wireless communication node;
receive, via a receiver in, information to be used for selection of a relay device, the information generated by the wireless communication node based on the configuration setup; and
determine whether to wirelessly connect with the first wireless communication device as the relay device.

20. A first wireless communication device, comprising:
at least one processor configured to:
send, via a transmitter in vicinity of a second wireless communication device, a configuration setup to support relay services to a wireless communication node;
receive, via a receiver, information to be used for selection of a relay device generated by the wireless communication node;
send, via the transmitter, the information to be used for selection of the relay device to the second communication device; and
cause the second wireless communication device to determine whether to wirelessly connect with the first wireless communication device as the relay device.

* * * * *